(12) United States Patent
Allano et al.

(10) Patent No.: US 9,576,181 B2
(45) Date of Patent: Feb. 21, 2017

(54) BIO-IMAGING METHOD

(71) Applicants: BioMérieux, Marcy-l'Etoile (FR);
Commissariat á l'Energie Atomique et aux Energies Alternatives, Paris (FR)

(72) Inventors: Loréne Allano, Sevres (FR);
Guillaume Sutra, Chilly-Mazarin (FR);
Lorette Munoz, Lagnieu (FR); Corine Fulchiron, Serrieres de Briord (FR);
Dominique Decaux, Chaponost (FR);
Frédéric Pinston, Grenoble (FR)

(73) Assignees: BioMerieux, Marcy-l'Etoile (FR);
Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 14/441,471

(22) PCT Filed: Nov. 7, 2013

(86) PCT No.: PCT/EP2013/073291
§ 371 (c)(1),
(2) Date: May 7, 2015

(87) PCT Pub. No.: WO2014/072422
PCT Pub. Date: May 15, 2014

(65) Prior Publication Data
US 2015/0278575 A1    Oct. 1, 2015

(30) Foreign Application Priority Data

Nov. 7, 2012  (EP) .................................. 12306372

(51) Int. Cl.
*G06K 9/00* (2006.01)
*G06T 7/00* (2006.01)
(Continued)

(52) U.S. Cl.
CPC ......... *G06K 9/0014* (2013.01); *G06K 9/00127* (2013.01); *G06K 9/00134* (2013.01);
(Continued)

(58) Field of Classification Search
None
See application file for complete search history.

(56) References Cited

U.S. PATENT DOCUMENTS 6,243,486 B1   6/2001  Weiss
2004/0101189 A1   5/2004  Green et al.
(Continued)

FOREIGN PATENT DOCUMENTS

FR    2926820 A1    7/2009
JP    2010104301 A   5/2010
(Continued)

OTHER PUBLICATIONS

Duda et al., "Use of the Hough Transformation To Detect Lines and Curves in Pictures", Jan. 1972, *Comm. ACM*, 15:1(11-15).
(Continued)

*Primary Examiner* — Oneal R Mistry
(74) *Attorney, Agent, or Firm* — Pepper Hamilton LLP

(57) ABSTRACT

A method for defining an isolation area around an object of interest in a cell culture vessel, the method comprising the steps of: —obtaining one or more images of the cell culture vessel using one or more of a plurality of illumination sources, each illumination source being capable of illuminating the vessel from a different direction; —selecting an image or combination of images for further processing; —applying a circular object detection transformation to identify one or more objects of interest being substantially circular objects in the cell culture vessel, which circular objects of interest are representative of isolated colonies in the cell culture vessel and determining the center of an
(Continued)

object of interest; —applying a binarizing step to obtain a binarized image of the object of interest and other objects, wherein the center of the binarized image corresponds to the center of the object of interest; —iteratively forming concentric circles with increasing radius, wherein the concentric circles are centered on the center of the binarized image; —identifying coronas, wherein a corona is delimited by two circles having successive radius values; —for each corona: determining the presence and the location of any other object located in the corona to determine the presence and the location of other objects; —determining a clearance angle defining an angular sector free of other objects around the object of interest to define the isolation area around the object of interest.

4 Claims, 32 Drawing Sheets

(51) Int. Cl.
   *G06T 7/40* (2006.01)
   *G06T 5/00* (2006.01)

(52) U.S. Cl.
   CPC ............ *G06T 5/005* (2013.01); *G06T 7/0012* (2013.01); *G06T 7/0042* (2013.01); *G06T 7/0083* (2013.01); *G06T 7/408* (2013.01); *G06T 2207/10016* (2013.01); *G06T 2207/10024* (2013.01); *G06T 2207/10056* (2013.01); *G06T 2207/10152* (2013.01); *G06T 2207/20061* (2013.01); *G06T 2207/20076* (2013.01); *G06T 2207/20152* (2013.01); *G06T 2207/30024* (2013.01); *G06T 2207/30242* (2013.01)

(56) References Cited

U.S. PATENT DOCUMENTS

| | | |
|---|---|---|
| 2004/0101954 A1 | 5/2004 | Graessle et al. |
| 2007/0109499 A1* | 5/2007 | Yan .......................... A61B 3/12 351/221 |
| 2010/0232660 A1 | 9/2010 | Graessle et al. |
| 2011/0026789 A1* | 2/2011 | Hsu ....................... G06K 9/0061 382/128 |
| 2013/0094750 A1* | 4/2013 | Tasdizen ............... G06K 9/0014 382/134 |
| 2013/0188033 A1* | 7/2013 | Oda .................... G01N 15/1463 348/79 |

FOREIGN PATENT DOCUMENTS

| | | | |
|---|---|---|---|
| WO | WO 03/067904 A2 | 8/2003 | |
| WO | WO 2012117647 A1 * | 9/2012 | ......... G01N 15/1463 |

OTHER PUBLICATIONS

Canny, "A Computational Approach to Edge Detection", Nov. 1986, *IEEE Transactions on Pattern Analysis and Machine Intelligence*, PAMI-8:6(679-698).
Wu et al., "Microscope Image Processing", Jan. 1, 2008, *Academic Press*, (113-194).
International Search Report mailed Mar. 27, 2014 for International Patent Application No. PCT/EP2013/073291.

* cited by examiner

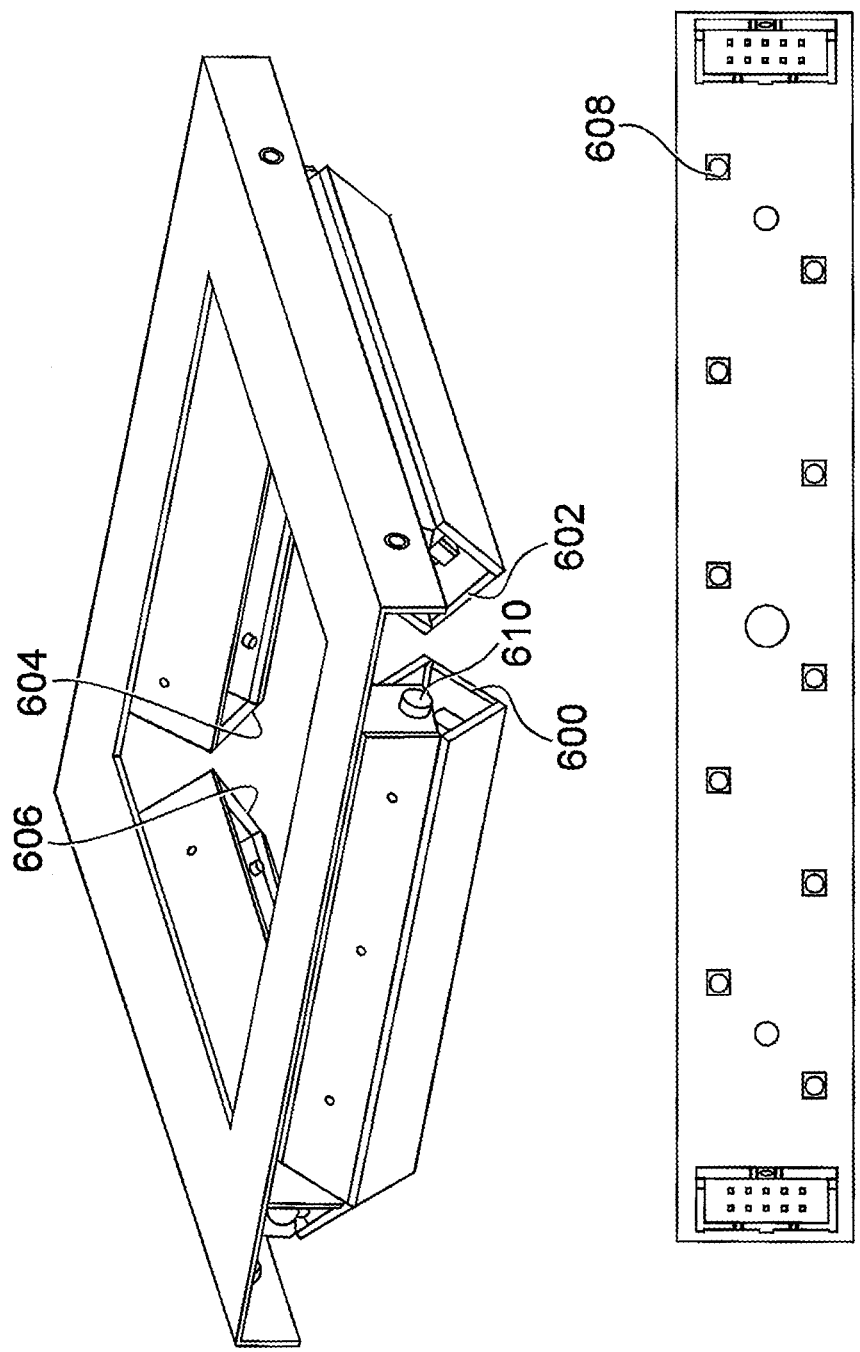

| View | Opaque culture | Transparent / semi transparent culture |
|---|---|---|
| Backlight | If media is blood agar (COS / CAN / PVX / ...) show hemolysis | Better view of the information of the bottom of the dish (including serigraphy, bare codes, ...) |
| Near horizontal | N.A. | After correction, less impact of dish bottom on global view (less dust, less impact of serigraphy, ...) |
| Annular | Best view for over all color rendering. Closest to what biologist are used to see | |
| Lateral annular | Still good color rendering. Lighting from one side produces shadows that give some relief impression (some texture info), but non homogeneous colors | |
| Inverted annular | Other color rendering (same that could be obtained when changing light incidence on the dish) texture / relief impression with color information. Good view for swarming detection | |
| Vertical | Surface of the dish information. Good view for swarming detection, bubble, dust evidence. Monochrome information of colonies surface / aspect | |

FIG. 7

Differences between COS and CPS versions

| Modules / views used | V1 CPS | V1 COS |
|---|---|---|
| Number of views used | 4 : Backlight, Bottom, Left/Bottom, Top | 3 : Backlight, Bottom, Vertical |
| Isolated colonies detection | Backlight, Bottom, Top | Backlight, Bottom |
| Isolated colonies detection on serigraphy zone | Bottom, | Bottom, |
| Binarization | Backlight, Bottom, Left/Bottom | Bottom |
| Serigraphy detection | Backlight | Backlight |
| Positioning mark detection | Bottom | Bottom |
| Swarming detection | X | Vertical |
| Results visualisation | Bottom | Bottom |

FIG. 8

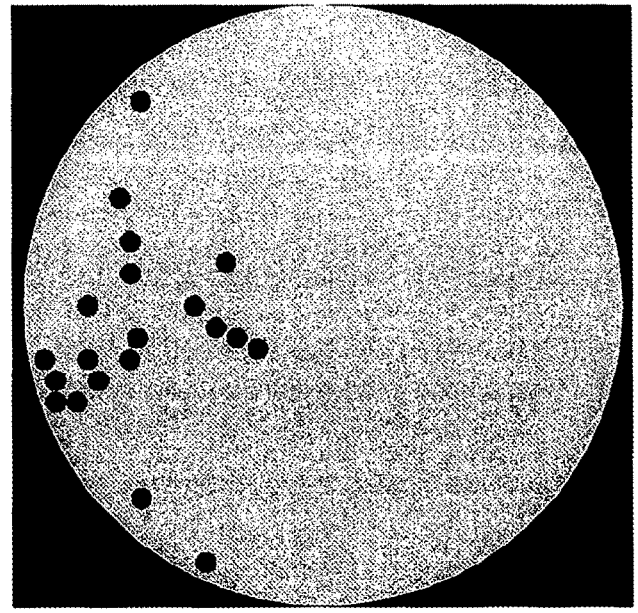
FIG. 9b Objective
FIG. 9a Source

| Criterion name | Full Corona (in mm) | Partial Corona (in mm) | Clearance Angle (in °) |
|---|---|---|---|
| C1 | 3 | - | - |
| C2-A1 | 2 | 3 | 180 |
| C2-A2 | 2 | 5 | 90 |
| C2-A3 | 2 | 7 | 30 |
| C3-A1 | 1 | 3 | 180 |
| C3-A2 | 1 | 5 | 90 |
| C3-A3 | 0.5 | 3 | 180 |

FIG. 15

BIO-IMAGING METHOD

CLAIM OF PRIORITY

The present application is a National Stage filing under 35 U.S.C. §371 of International Patent Application No. PCT/EP2013/073291, filed on Nov. 7, 2013 and entitled "BIO-IMAGING METHOD," which claims the benefit of and priority to European Patent Application No. 12306372.9, filed on Nov. 7, 2012, entitled "Bio-Imaging Method," both of which are incorporated by reference herein in their entireties.

FIELD OF THE INVENTION

The present invention relates to methods and computer program products for analyzing in vitro samples.

BACKGROUND OF THE INVENTION

In vitro analysis is carried out in many environments in order to identify biological samples such as microorganisms, cell and tissue cultures, cellular or sub-cellular extracts, and purified molecules. Samples of various materials are isolated from their usual biological context and provided with an environment in which they can grow. This environment is often provided in the form of a Petri dish which is placed into an incubator in order for the samples to grow. The Petri dish normally includes a microbiological culture medium which encourages growth of the sample. Ideally, incubation on an appropriate culture medium gives rise to the growth of a number of colonies of the sample. Subsequent analysis of the colonies is generally carried out to identify the microorganisms and assess their sensitivity or resistance to antimicrobials.

An important part of the analysis of the samples is the ability to identify particular microorganisms or bacteria, for example, in the colonies. In addition, the treatment of bacteria with appropriate medication can also be analyzed based on the growth of the microorganisms in the sample and the interaction with any medication applied to the sample.

Much of the preliminary analysis is carried out by visual analysis of the Petri dish by qualified scientists. Preliminary visual analysis works well, but is prone to human error and inconsistency due to the huge diversity of shapes, colors, sizes and forms of the different microorganisms which may be difficult to interpret. However, visual inspection is still one of the best ways to quickly identify microorganisms at present.

In addition, as much of the growth is "random", it is not easy to model microorganism growth and find automated systems which lend themselves to the diversity identified above.

Known incubators may include a window through which samples can be viewed, but in general, the Petri dish is taken out of the incubator to be visually analyzed. Preliminary visual analysis involves holding the Petri dish in front of a light source to identify colonies. Further detailed chemical and microscope analysis methods can then be carried out on particular identified colonies, as required.

Biological scanners, i.e. devices used to scan or count bacterial colonies, are known in the state of the art. For example, US 2004/0101951 and US 2010/0232660 both disclose biological scanners for scanning biological growth plates having different structures but both having in common the ability to generate images of the plates and perform an analysis of these images to detect biological growth. However, both use a single light source providing front or back illumination. Indeed, it is stated in both US2004/0101951 and US2010/0232660 that "some biological growth plates may require only front or back illumination, but not both." Such illumination is basic and does not allow images of a sufficient quality to carry out a preliminary analysis in an efficient manner to be obtained.

Certain prior art systems exist in which a sample in a Petri dish is illuminated by different colors or wavelengths of light in order to form images of the sample. The images are captured by an appropriately orientated camera.

FR2926820 discloses a method for detecting at least one specific microorganism in a biological sample, said method comprising, amongst others, the step of subjecting a culture medium to at least two radiations, each presenting a specific wavelength. Preferably, two lighting systems are used, each lighting system emitting radiation of a specific wavelength. More specifically, FIG. 1 of FR2926820 shows the combination of visible top lighting and ultraviolet backlighting. The subsequent combined image from the two different illuminations is then used to detect the presence of specific microorganisms.

Similarly, published Japanese patent application, JP2010104301, describes, amongst others, a method for detecting microorganisms comprising an imaging step to take an image of a culture medium on which microorganisms grow and a colony detection step, said method also using a combination of top lighting and backlighting.

Once an image of a biological sample has been obtained, processing techniques can be used to enhance the image. However, there are many problems associated with enhancing images of biological samples. These problems may relate to:
the sizes of colonies being viewed;
the proximity of one colony to another;
the color mix of the colonies;
the nature of the Petri dish;
the nature of the culture medium
etc.

A first problem of the present invention relates to the determination of the neighborhood of a colony to provide guidance regarding the picking process of the colony. It appears that there is a need to determine one or more isolation areas around a colony.

Another problem relates to the presence of illumination artifacts, such as specular reflections, which result from the use of a directional illumination source. It appears that there is a further need to solve the problem of illumination artifacts located on colonies in an image of a biological sample.

A further problem relates to the determination of the number of colonies, taking into account the colonies located in the periphery of the Petri dish. It appears that there is a need to improve the counting process of the colonies in an image of a biological sample.

OBJECTS OF THE INVENTION

It is an object of the present invention to overcome at least some of the problems mentioned above.

SUMMARY OF THE INVENTION

The present invention provides a method and computer program product as set out in the accompanying claims.

According to a first aspect of the present invention there is provided a method for defining an isolation area around an object of interest in a cell culture vessel, the method comprising the steps of:

obtaining one or more images of the cell culture vessel using one or more of a plurality of illumination sources, each illumination source being capable of illuminating the vessel from a different direction;

selecting an image or combination of images for further processing;

applying a circular object detection transformation to identify one or more objects of interest being substantially circular objects in the cell culture vessel, which circular objects of interest are representative of isolated colonies in the cell culture vessel and determining the center of an object of interest;

applying a binarizing step to obtain a binarized image of the object of interest and other objects, wherein the center of the binarized image corresponds to the center of the object of interest;

iteratively forming concentric circles with increasing radius, wherein the concentric circles are centered on the center of the binarized image;

identifying coronas, wherein a corona is delimited by two circles having successive radius values;

for each corona:

determining the presence and the location of any other object located in the corona to determine the presence and the location of other objects;

determining a clearance angle defining an angular sector free of other objects around the object of interest to define the isolation area around the object of interest.

Preferably, the method further comprises providing a picking profile of the object, wherein the picking profile comprises values related to each corona and a corresponding clearance angle.

Preferably, the method further comprises using the picking profile in association with a look-up table for a picking process to determine the availability of a picking process for a colony relating to specific criteria of the look-up table.

There is provided a computer program product comprising instructions for causing a programmable data processing apparatus to perform image processing steps of the method according to the first object of the invention, or to serve as the data processing apparatus set forth above. The computer program product may comprise said instructions stored in a machine-readable storage medium.

According to a second aspect of the present invention there is provided a method for forming an improved image of a biological sample, wherein the image comprises pixels, each pixel having a first pixel value, the method comprising the steps of:

illuminating the biological sample with a number of N illumination sources;

taking an image of the biological sample for each different illumination source to obtain N images;

using the obtained N images to determine N pixel values;

determining a corrected pixel value based on the N pixel values;

for each pixel, replacing the first pixel value with the corrected pixel value to obtain an improved image of the biological sample.

Preferably, the method further comprises illumination sources which are homogeneously arranged around the biological sample, the illumination sources having the same incidence angle with the biological sample.

Preferably, the N images comprise N color images associated with corresponding color channels or N black and white images.

Preferably, the corrected value is the median value of N pixels values and the median value is computed for each color channel.

There is provided a computer program product comprising instructions for causing a programmable data processing apparatus to perform image processing steps of the method according to the second object of the invention, or to serve as the data processing apparatus set forth above. The computer program product may comprise said instructions stored in a machine-readable storage medium.

According to a third aspect of the present invention there is provided a method for determining the number of objects in an image of a cell culture vessel comprising elements made of objects and groups of objects, the method comprising the steps of:

taking an image of the cell culture vessel and the elements using a determined view of an illumination source;

applying a binarizing step to obtain a binarized version of the image, wherein the binarized image comprises an inner binarized image and an outer binarized image, wherein the inner binarized image corresponds to the inner portion of the cell culture vessel and the outer binarized image corresponds to the outer portion of the cell culture vessel;

determining the location of each elements in the binarized image to determine if a component is located in the inner binarized image or in the outer binarized image;

if the component is located in the inner binarized image, replacing pixel values of pixels representing the image of the component in the inner binarized image with corresponding first pixel values to obtain a first composed image;

if the component is located in the outer binarized image, replacing pixel values of pixels representing the image of the component in the outer binarized image with corresponding second pixel values to obtain a second composed image;

combining the first composed image and the second composed image to obtain a composed image wherein pixel values of the composed image depend on the proximity of the pixel to the edges of the object;

applying a segmentation algorithm to the composed image to obtain an image comprising objects with identifiable edges.

Preferably, the binarizing step comprises an inner binarizing step and an outer binarizing step.

Preferably, the outer binarizing step comprises applying a morphological closing function to obtain a resulting image, wherein the determined view is a backlight view.

Preferably, the resulting image is converted from a first color space to a second color space that is more perceptually uniform, such as a L,a,b color space.

Preferably, the first pixel values of the element are determined by using pixel values of the element, wherein the determined view is a bottom annular view.

Preferably, the second pixel values of the element are determined by computing an average value of pixel values of the element in a corresponding image distance of the outer binarized image and pixel values of the element in the resulting image.

Preferably, the segmentation algorithm is a watershed algorithm.

There is provided a computer program product comprising instructions for causing a programmable data processing apparatus to perform image processing steps of the method according to the third object of the invention, or to serve as the data processing apparatus set forth above. The computer program product may comprise said instructions stored in a machine-readable storage medium.

BRIEF DESCRIPTION OF THE DRAWINGS

Reference will now be made, by way of example, to the accompanying drawings, in which:

FIG. 6 is a schematic representation of the annular illumination source, according to one aspect of the present invention;

FIG. 7 is a table showing different illumination types for different applications, according to one aspect of the present invention;

FIG. 8 is a table showing different illumination types for different culture media associated with different image processing techniques, according to one aspect of the present invention;

FIG. 9a is a source image for a first image enhancement technique, according to one aspect of the present invention;

FIG. 9b is a resultant image after the first image enhancement technique, according to one aspect of the present invention;

FIG. 15 shows an example of a look-up table according to the prior art;

DETAILED DESCRIPTION OF THE PREFERRED EMBODIMENTS

The present invention relates to a method for analyzing biological specimens in a fully or semi-automated manner. In the present description, the term 'object' relates to a real object such as bubbles or colonies, the term 'mark' relates to a characteristic of a cell culture vessel such as a Petri dish. The mark may, for example, relate to an artifact or ink dots related to a serial number or any identification mark. The term 'feature' relates to a characteristic of an object such as a colony. In addition, the term 'Petri plate' defines an assembly of a Petri dish and a lid to cover the Petri dish.

Figure 1:
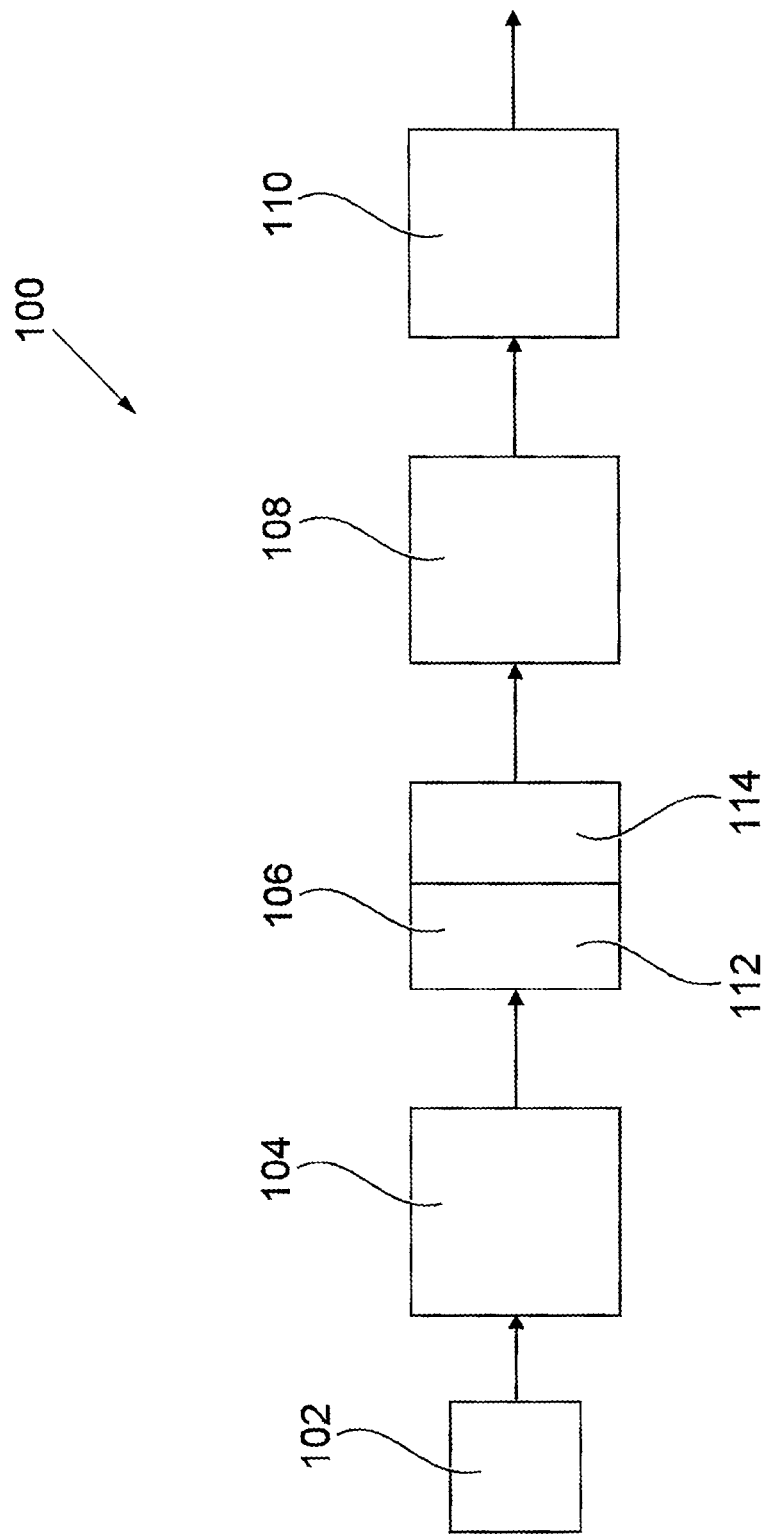
FIG. 1 is a biological analysis system, according to one aspect of the present invention.

As shown in FIG. 1, a system 100 includes a sample vessel bank 102, an automatic streaking machine 104, a smart incubator system 106, a processing unit 108 and an identification system 110.

The sample bank 102 manually or automatically produces sample vessels in which biological samples can be grown and subsequently analyzed. The sample vessel is typically a Petri dish, although other cell culture vessels may also be used. Accordingly, reference to a Petri dish herein is not intended to be limitative.

The sample vessel bank adds an appropriate culture medium to the dish to enable the biological sample to grow. The Petri dish may be passed from the sample vessel bank to the following stage of the process by means of a conveyor belt or other automated system. Alternatively, the samples can be passed to the following stage by an operator.

The automatic streaking machine 104 applies a biological sample to the Petri dish and then distributes the sample in a known manner. In a Petri dish, for example, the sample is applied using a comb having a length approximately equal to the radius of the dish. The comb is applied and then turned to spread the biological sample over the surface of the dish. An example of a suitable automatic streaking machine is commercialized by the applicant under the PREVI® Isola brand name.

Once the biological sample has been distributed over the culture medium in the dish, the dish is passed to the next stage of the process either manually by an operator or by means of a conveyor belt or other automated system.

The smart incubator system 106 includes an incubator 112 and an imaging system 114. The Petri dish is introduced into the incubator and is incubated for a predetermined time at a predetermined temperature. This enables the biological sample to grow producing a number of colonies of microorganisms over the surface of the dish. Once the dish has been incubated as required, the dish is passed to the imaging system 114. The imaging system is a unique, novel system for generating images of the colonies and cultures generated in the system as a whole. The details of the imaging system will be described further below.

The images are used in the first stage of analysis of the samples. This stage can identify colonies and other aspects of the biological sample to aid and facilitate further activities and functions of the overall system.

After the images of the dish have been produced, the dish is then passed to the next stage of the process. This may be carried out either automatically by a conveyor belt or other automated system or manually by an operator.

The processing unit 108 can take on a variety of different forms depending on the sample analysis required. For example, particular colonies may be extracted, based on the images, for further analysis or processing. Many other processes can be applied to the dish at this time. If necessary, the dish can be returned to the incubator for further growth and/or returned to the imaging system.

After all necessary processing and imaging has been completed, the dish may be passed to the identification system 110 by means of a manual or automated process. The identification system 110 may be used to identify the microorganisms that are present in the form of colonies on the dish in a multitude of ways. Identification can be carried out by analysis of the metabolism of the microorganism and can be either automated or manual. An automated analysis can be carried out, for example, with the VITEK® system commercialized by the applicant. Identification can also be performed using mass spectrometry technology. Other analysis could also comprise detecting antimicrobial resistance mechanisms.

It will be appreciated that the various elements of the overall system may be changed to carry out different functions. In addition, certain steps may be carried out in different orders.

Figure 2C:
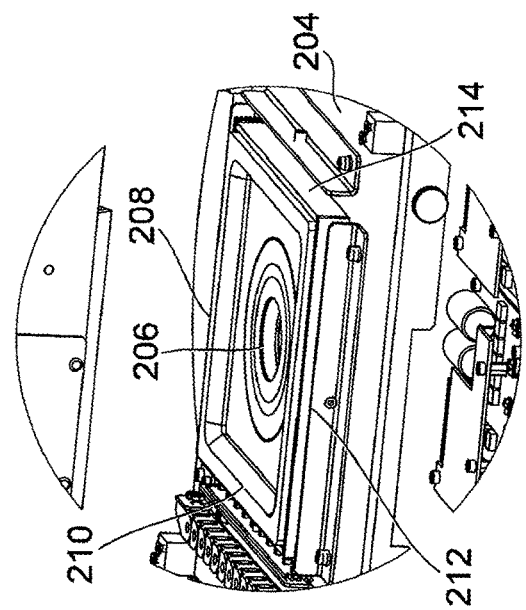
FIGS. 2a, 2b and 2c are schematic diagrams of the imaging system of the FIG. 1 system, according to one aspect of the present invention.

As previously mentioned, the smart incubator system is an important aspect of the present invention and includes the unique imaging system. The imaging system will now be described in greater detail with reference to FIGS. 2a, 2b and 2c. The imaging system 114 includes a base unit 202. The base unit includes the optics and control circuitry for generating red, green and blue backlighting illumination. The base unit may include a controller which may be in the form of a wheel that has three positions as shown in FIG. 2b. These positions correspond to different illuminations which are "noBackground", "whiteBackground" and "blackBackground". The "noBackground" position relates to a circular hole 150 in the wheel. The "whiteBackground" position relates to a white background circle 160 in the wheel. The "blackBackground" position relates to a black background circle 170 in the wheel. No background is used for backlight, whilst white and black backgrounds are used for all other types of illumination, depending on the nature of the sample.

Above the base unit, there is a sample holding unit 204. The sample holding unit may include a drawer which can slide in and out and includes a recess 206 which is adapted to support a Petri dish. In addition, as shown in FIG. 2c, the sample holding unit includes four red/green/blue horizontal illumination sources, respectively 208, 210, 212 and 214. The four illumination sources are located rectilinearly around the sample recess and are independently controllable. In use, the top of the Petri dish is substantially in line with the top of the four horizontal illumination sources. The horizontal illumination sources allow the Petri dish to be illuminated with a horizontal or near horizontal beam.

It should be noted that the bottom of the recess is optically transmissive to allow the backlight illumination to illuminate the sample in use. The sample holding unit further includes the optics and controls required to operate the four horizontal illumination sources.

The sample holding unit may comprise an alternative orientation (not shown) in which the samples are moved into position for imaging by a conveyor belt. The drawer may be replaced by a conveyor belt system having sample holding zones, each of which is transparent to allow backlighting to be used. The conveyor belt system can move the sample into an appropriate position and then the necessary images can be taken. The conveyor belt then moves the next sample into position for imaging, while the first sample is moved on to the next stage of processing. This enables images to be taken at different positions and also while the sample is moving.

In a further alternative, the system may include a robotic arm which is able to load Petri dishes into the sample holder or onto the conveyor belt. In addition, the robotic arm may remove the lid of the Petri dish prior to imaging and replace the lid thereafter. This can be done by inverting the Petri dish and causing the lid to fall off. Removing the lid ensures the lid does not produce reflections when the sample is illuminated by certain illumination sources.

In addition to movement into and out of the imaging zone, the sample holding unit may also include a mechanism to change the position of the sample relative to the normal position. For example, the sample holder may be able to orientate the sample to be at a specific angle to a specific beam. Other movements, such as rotation of the sample, can also be carried out with appropriate mechanisms. As a result, any relative movement of the sample and the illumination sources can be achieved by moving either the sample in the sample holding unit or the illumination source. The variations are endless.

When the sample holding unit is in a normal position, such as a horizontal position over the wheel in the imaging system, a mask may be added to improve the quality of images taken of the interior of the Petri dish.

The imaging system 114 further includes a first intermediate unit 216 which is situated above the sample holding unit. The first intermediate unit includes four rectilinearly positioned red/green/blue illumination sources 218, 220, 222 and 224 respectively. The illumination sources are adapted, in use, to produce annular illumination onto the sample recess in the sample holding unit and are each independently controllable. The annular illumination can be adjusted to be incident on the sample from any appropriate direction, including lateral, non-lateral or any other appropriate orientation.

Figure 2A:
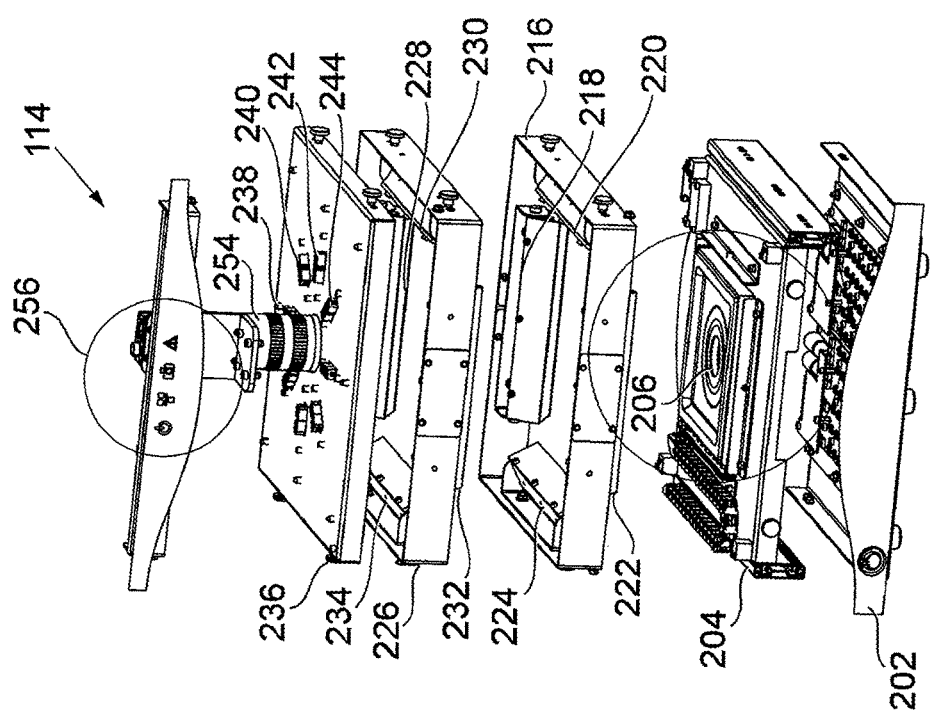
Figure 2B:
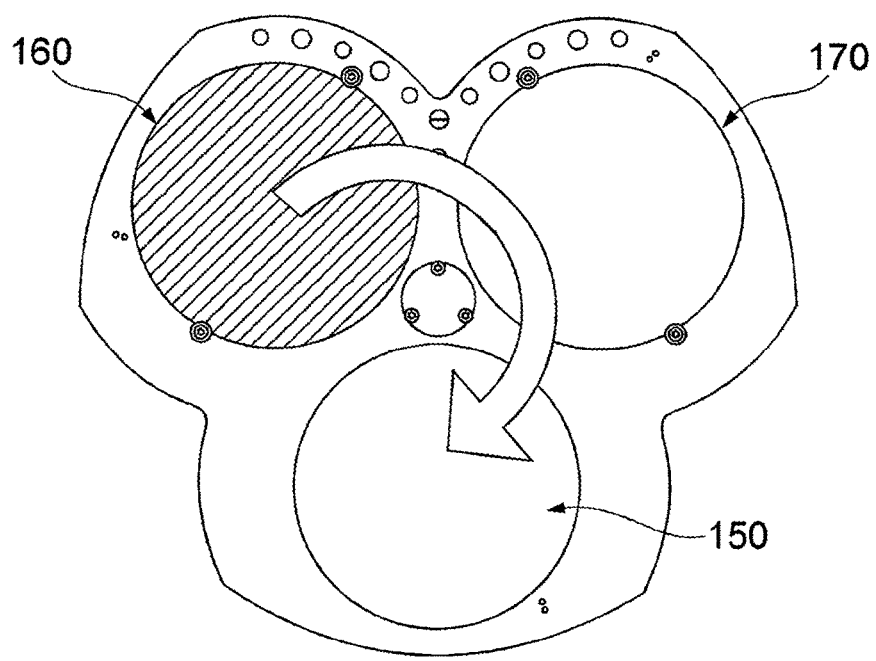

The imaging system also includes a second intermediate unit 226 as shown in FIG. 2a. The second intermediate unit includes four rectilinearly positioned red/green/blue illumination sources 228, 230, 232 and 234 respectively. The illumination sources are each independently controllable and are directed upwards and reflect from the unit above to give rise to an inverse annular illumination which, in use, illuminates the sample in the sample recess.

The head unit 236 of the imaging system is located above the second intermediate unit. The head unit includes white light illumination sources respectively 238, 240, 242, 244, 246, 248, 250 and 252, of which four are shown 238, 240, 242, 244. Each is independently controllable. The eight illumination sources are arranged, in use, to produce vertical illumination onto the sample recess.

The head unit also includes an image capture device 254, such as a camera, which is directed towards the sample recess. Illumination from any combination of illumination sources from any of the units can be directed to the sample recess. The image capture device can then capture images from any samples in the sample recess which have been illuminated. The use and further processing of the images will be explained in greater detail below.

The head unit may also include a control pad 256 which is used to operate the various light sources. In addition to the control circuitry and optics in each unit which control the function thereof, there may be an overall control system (not shown). The control system may include a computer, a display unit, processing modules and image enhancing algorithms, image processing, and any other processes or techniques.

The control system may be used to control which illumination sources are used for specific applications. In addition, the control system may apply different image enhancing techniques and image processing for different applications. Image enhancing techniques are methods and techniques to enhance the quality of the image or to make pertinent information visible for an expert to view or manipulate.

Examples that will be described in greater detail below include: correction of illumination artifacts, etc. Image processing is the extraction of information from images in order to provide decision support or automatic decisions. This does not necessarily include a modification of the image but instead a determination of higher level information/interpretation in an automated manner. Examples that will be described in greater detail below include: detection of the dish borders, detection of illumination artifacts, determination of the colony picking profile, determination of the number of colonies, detection of growth (masses, isolated colonies, swarming), global decision on growth/no growth, etc.

Swarming is intended to indicate swarming motility, which is a rapid (2-10 μm/s) and coordinated translocation of a bacterial population across solid or semi-solid surfaces. This type of motility has been mostly studied in the genus *Serratia*, *Salmonella*, *Aeromonas*, *Bacillus*, *Yersinia*, *Pseudomonas*, *Proteus*, *Vibrio* and *Escherichia*.

The control system may be used to carry out any other function and/or control operation for the imaging system. These include, but are not limited to:
- loading and unloading the sample into the sample recess;
- checking and adjusting the positioning of the sample in the sample recess;
- controlling the level of luminance;
- controlling the balance of the red/green/blue components;
- controlling exposure time;
- controlling illumination combinations;
- testing the system;
- calibrating the system; and
- any other appropriate control based on the use and purpose of the analysis.

Each of the units forming the imaging system is capable of being moved relative to the other units. When this occurs, certain optical adjustments may be necessary to ensure the sample is illuminated by all sources.

The operation of the imaging system will now be described in more detail with reference to FIG. 3.

Figure 3:
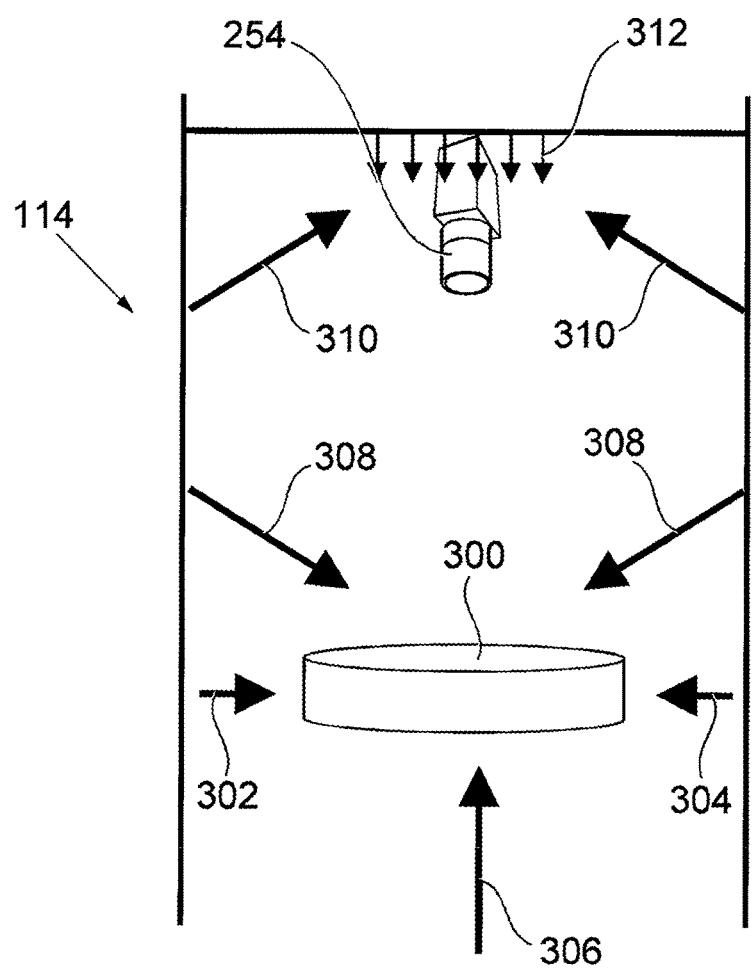
FIG. 3 is a simplified diagram of the FIG. 2 system showing the different types of illumination applied to a sample, according to one aspect of the present invention.

FIG. 3 shows a schematic diagram of the imaging system 114 to demonstrate the various illumination sources and how they impact on a sample 300 located in the imaging system. The sample 300 may be illuminated by a near horizontal beam 302, 304. The near horizontal beam includes components into and out of the gripper in addition to those illustrated by references 302 and 304. The near horizontal beam is produced by the horizontal illumination sources in the sample holding unit 204 of FIG. 2a. The sample may also be illuminated by a backlight beam 306 generated by the base unit 202 in FIG. 2a.

An annular beam 308 may also illuminate the sample 300 and is produced by the first intermediate unit 216. An inverse annular beam 310 produced by the second intermediate unit 226 can also illuminate the sample.

A vertical beam 312 can also illuminate the sample and is generated by the illumination sources in the head unit 236.

The vertical beam and the backlight illumination apply illumination in a substantially perpendicular direction relative to the sample in the Petri dish. The optical axis of each of these illumination sources is thus also perpendicular to the sample. The near horizontal, the annular and the inverse annular illuminations are not perpendicular to the Petri dish. Similarly, the optical axes of these sources are non-perpendicular to the sample. The non-perpendicular sources provide a diverse range of alternative images to those achieved with perpendicular sources. These non-perpendicular sources provide additional and different optical features in any image created with them. This ensures improved isolation and detection of colonies.

Figure 4A:
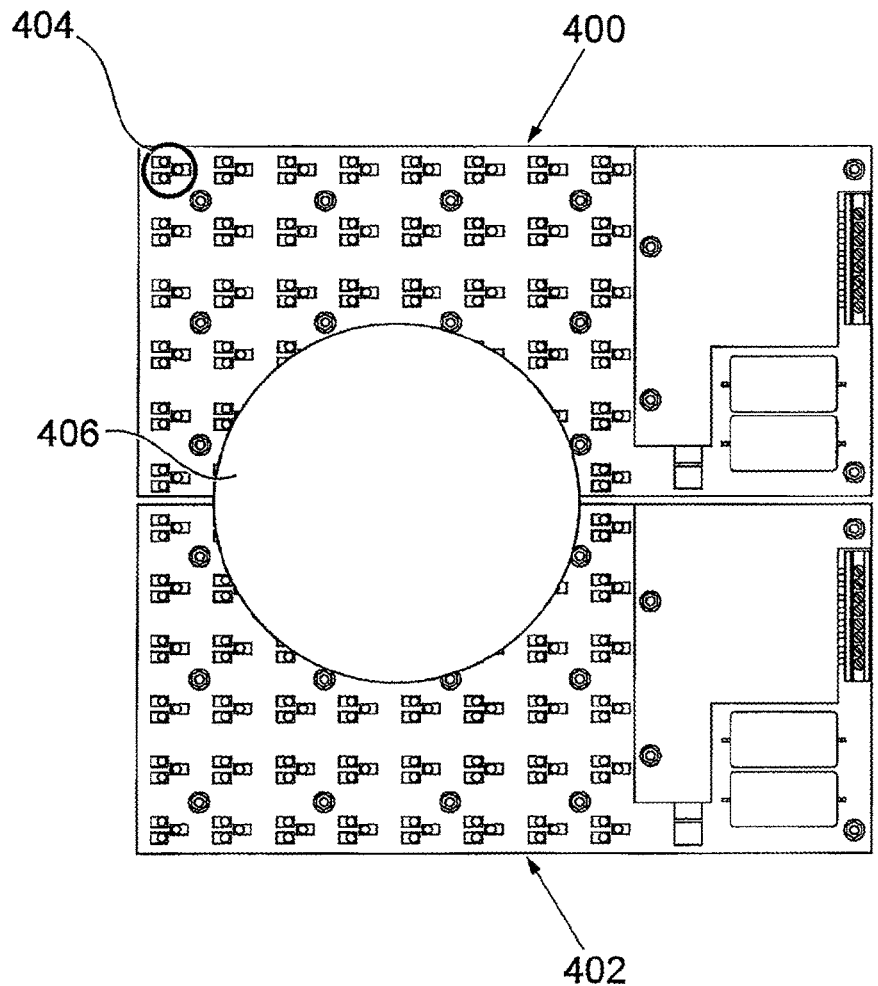
FIG. 4a is a schematic representation of the backlight illumination source, according to one aspect of the present invention.

The illumination sources shown in FIG. 3 and produced by the appropriate unit in FIG. 2a may be of any preferred type, such as light emitting diodes (LED) operating at red, green and blue (RGB) frequencies; a simple white light source; an ultraviolet (UV) source or any other appropriate radiation source. The illumination sources may comprise, for example, 322 LEDs including 64 white LEDs, 86 red LEDs, 86 green LEDs and 86 blue LEDs. The number of light sources in any location can vary from that shown and described herein. RGB illumination is provided at each location by a trio of three LEDs operating at each respective frequency. For different illumination sources there may be different combinations of RGB LEDs. For example, for backlight illumination, the LEDs may be orientated as shown in FIG. 4a. Each type of illumination is provided by means of specific cards comprising specific arrangements of LEDs. The base unit 202 produces the backlight beam 306 by means of two cards 400 and 402, each including a plurality of diodes arranged in threes. Each trio of LEDs 404 includes a red, a green and a blue LED. The position of the sample is shown at 406. In total, 45 trios of LEDs are located on each card and are used to generate the backlight beam 306. In each trio, the red, green and blue LEDs can be illuminated one at a time to produce one colored illumination after another.

It will be appreciated that any appropriate orientation and number of diodes can be used instead of the example described above. In addition, different combinations of RGB LEDs can be selected and used.

In addition, for UV sources, the UV illumination is provided by means of two cards which are simultaneously lighted. Each card comprises a UV LED of, for example, 500 mA intensity.

Figure 4B:
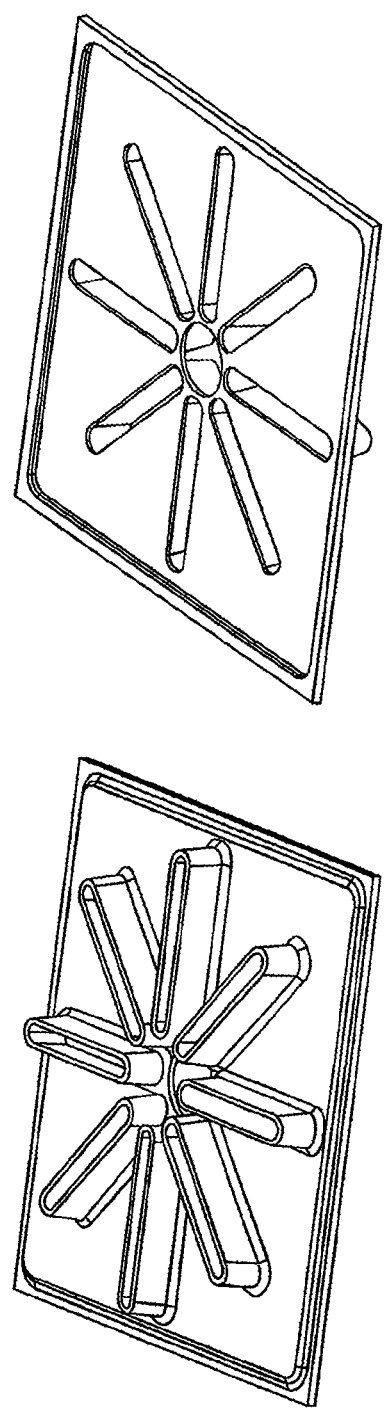
FIG. 4b is a schematic front view and rear view representation of a diffuser related to a vertical illumination.

The card may include sensors for determining temperature and possible aberrations of the LEDs, so that the LEDs can be switched off for a few seconds in continuous operation if problems can be foreseen. As shown in FIG. 4b, there may also be a diffuser between the cards 400 and 402 and the sample in the recess. The diffuser helps to prevent the LEDs being visible in the resulting picture and also helps to make the background light homogenous. In addition, the diffuser absorbs some of the illumination from the powerful LEDs. When direct lighting is used, a very short exposure time may be used to minimize any effects relating to smearing caused by the camera.

Figure 5:
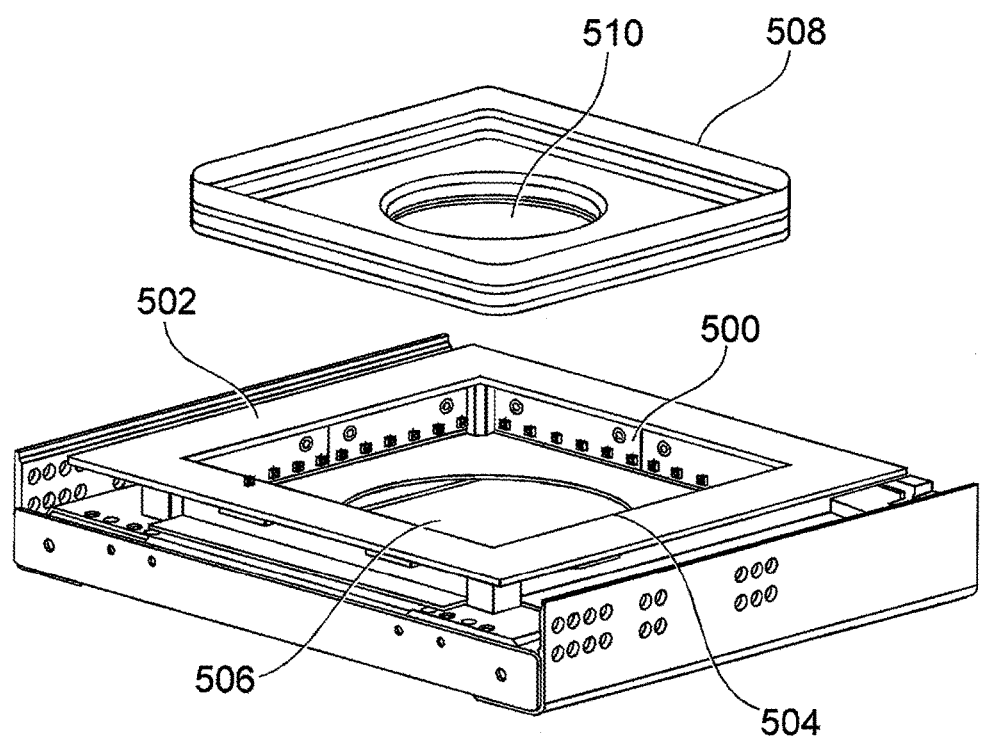
FIG. 5 is a schematic representation of the sample drawer and associated near horizontal illumination source, according to one aspect of the present invention.

FIG. 5 shows the illumination sources located in the sample holding unit 204 producing the near horizontal beam 302, 304. There are eight cards, each covering half the length of sides 500, 502, 504 and 506 respectively. Each card carries an array of 8 trios of RGB LEDs. The illumination sources can be controlled together, independently or in any predetermined sequence. The eight cards form part of the sample drawer mechanism which includes the sample recess. An optically transmissive interface 508 having different sized apertures 510 for different sized samples or Petri dishes can be used.

Figure 4C:
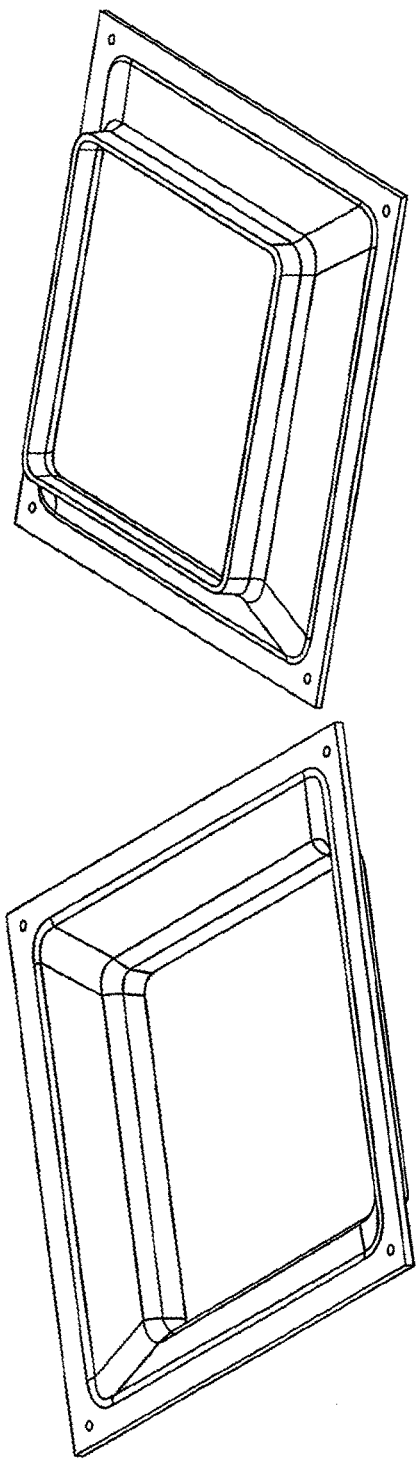
FIG. 4c is a schematic front view and rear view representation of a diffuser related to annular illumination.

Referring to FIG. 6, each of the four illumination sources in the first and second intermediate units 216 and 226 respectively includes four cards 600, 602, 604 and 606 respectively, each having an array of 10 RGB LEDs 608 oriented as shown. These arrays give rise to the annular beam 308 for the first intermediate unit 216 and the inverse annular beam 310 for the second intermediate unit 226. Each card can be controlled independently to operate either separately or in a combined manner. To prevent unwanted reflection from the sample and the culture medium, each card is equipped with a diffuser as shown in FIG. 4c. Each of the cards can be rotated around an axis, one of which is shown as 610 in FIG. 6, such that the annular beam can be positioned to optimize illumination of the sample. This adjustment is necessary to ensure homogeneous illumination, irrespective of the vertical position of the intermediate units relative to the sample.

FIG. 6 shows the positions of the cards for the first intermediate unit 216. It will be appreciated that those for the second intermediate unit 226 will be directed upwards and rotation will be adjusted accordingly.

The vertical illumination sources 238, 240, 242, 244, 246, 248, 250 and 252, in the head unit 236, each comprise a white light source where each source is independently controllable to produce the vertical beam 312.

The image capture device 254 in FIG. 2a is adapted to capture images of the sample from above. For a Petri dish with a diameter of 90 mm, a 100 mm$^2$ image will be produced. This typically equates to 2050 pixels$^2$ in a standard image capture device, although other pixel sizes, such as 2448×2050 pixels, may also be used. In addition, since the dish is generally of the order of 13 mm in height, the depth of field of the imaging device is approximately ±6 mm, depending on the thickness of the culture medium layer in the Petri dish.

In all instances of the illumination mentioned above, the image of the sample is captured from above by the imaging device 254. It should be noted that the camera may take a sequential set of images over a predetermined time period to measure the growth of colonies and other time related effects. In addition, the camera may be a video camera for certain applications where colony growth progress and the like are being measured. Movement of the dish may also be brought about by movement of the dish into and out of the imaging system by means of a suitable conveyor belt or robotic arm.

The camera is adapted to take different types of images from different illumination sources. A sequence of images may be required for a specific application. A sequence comprises the steps of illuminating the sample with a specific illumination or combinations of illumination, followed by the taking of a specific type of image, such as monochrome, black and white, or RGB with the relevant illumination. Next, a further image is taken with a different type of illumination or combination thereof and the sequence continues until all the required images have been taken. The camera is controlled within the sequence to take the appropriate type of image.

The camera may, for example, comprise a monochromic sensor and use the progressive scan CCD technology with a maximal speed of 17 images per second. The camera may have a power consumption of 12 to 24 Volts DC.

More details of the images produced and the image enhancement processes will now be described.

As previously mentioned, a sample in the imaging system 114 can be illuminated from a plurality of different light sources, which strike the sample from different directions. After the sample has been illuminated, an image of the sample is taken from above. Each illumination highlights different aspects of the sample.

The backlight illumination shows details of the Petri dish, including any markings on the base thereof, the form of the edge and the lid of the Petri dish; and a detailed view of the layout and density of the colonies in the sample. This illumination provides information which can isolate colonies, determine the difference between similar colonies (for example α and β hemolytic species) and generally gives a view of the contents of the sample.

One type of illumination used in the present invention is unique in the field of biological imaging. This is the near horizontal beam. Using a near horizontal beam on a Petri dish means that the beam passes through the edges of the Petri dish and lid and through the culture medium. This causes absorption of the light and would be expected to be less useful than beams from other directions in terms of identifying colonies and characteristics thereof. However, this is not the case.

The use of a near horizontal beam adds a significant amount of valuable information. This is the case even when there is significant absorption of the illumination as the beam passes through the Petri dish and culture medium. As the near horizontal beam collides with colonies, the beam is reflected and/or refracted towards the image capture device. This results in an image which clearly shows the positions of colonies. The result may be as shown in FIG. 9a. Whilst this image is useful, it includes a number of optical effects which make colony identification non-optimal. For example, the culture medium may have a non-uniform surface which has changes in color and contrast across the sample. Also, the edge includes significant interference based on the various layers of the Petri dish through which the illumination passes. This makes it difficult to identify colonies at the edge of the sample. The use of a near horizontal beam with an edge lighting correction technique may offer significant advantages in the identification and isolation of colonies. The stark contrast between the source and objective images is very clear. A user would have a much greater chance of identifying colonies by using an edge lighting correction process of the present invention. Near horizontal illumination is inappropriate for opaque cultures but is useful in transparent and semi-transparent cultures to remove dish artifacts and reduce the impact of dust and serigraphy. The near horizontal illumination is refracted and reflected by the sample and the contents thereof to form an image which can be used to isolate and eliminate artifacts. The image may also be used later to determine the percentage cover of the dish by colonies to provide an estimate of colony concentration and to determine growth or no growth on non-opaque culture media.

The annular illumination is directed towards the sample and is reflected or refracted to the image capture device by the culture medium and any colonies which have been formed. The purpose of the image produced by this illumination is to enable the colors of the culture medium and the colonies to be distinguished. The possibility to identify color is often an important tool for identifying specific microorganisms, as some have very distinctive coloration. The overall result is a view which is the closest to what a biologist would expect to see for a specific type of microorganism, for example, colors, colony aspects, etc. This is particularly important for identifying the subtle changes in coloration in the medium and around the colonies. In addition, images produced by annular illumination allow detection of subtle variations of colors below and around the bacterial colonies in chromogenic media.

The lateral annular illumination is an illumination of only one of the sources 218, 220, 222 and 224. This gives an image with shadows which can be used to identify contours and raised surfaces and texture. Each of the sources will give rise to different shadow effects as a result of the direction of illumination.

The inverse annular illumination is reflected from the head unit onto the sample. The sample then reflects or refracts the illumination to the image capture device. The image thus captured gives details of the contrast of the different colonies in the sample. This image can also provide color information. Further, this image can provide texture information; details of the aspect and color of the colonies; information on swarming limits and information about the raised surfaces of the colonies, such as elevation, form and shape.

The inverse annular illumination produces a quasi-vertical illumination which enables visualization of changes in gradient. This gives information on texture and granularity and is useful for detecting colonies which do not have much elevation but do have surface irregularities. In one embodiment, a number of different images are taken using the inverse annular illumination and subsequently combined in order to deal with any potential saturation of the image.

The vertical illumination source illuminates the sample from above. The illumination is reflected by the sample and the colonies to give an image which provides detailed contour information. This can be used to identify the raised surfaces of the sample and the height of colonies. This information can then be used to identify specific types of microorganisms as details of the raised surfaces of a colony are often very specific. For example, some colonies are dome-shaped, others are bumpy and others are flat. Thus, vertical illumination gives a good view of swarming, detection of bubbles, dust etc. Monochrome information of the colony surfaces and aspect is easily produced.

The variety of above illumination directions provided by the present invention offers an advantage, as many different types of illumination can be used to obtain images of colonies grown in a sample. The various images can be used to identify different characteristics and as a result provide an improved way of identifying these characteristics.

As described above, each of the illumination sources and directions can be used to accentuate and enhance different image characteristics. The examples described may be changed or adapted by using illumination from different sources and directions without departing from the scope of the present invention.

Furthermore, different wavelengths of illumination can be used for different applications, for example infrared and ultraviolet.

One of the applications of the present invention is to create images from a combination of illumination sources to generate a composite image.

Bottom annular views involve four illumination sources at different locations, i.e. front, back, left and right, and at an identical elevation angle from the Petri dish. The imaging system 114 illuminates simultaneously the Petri dish, with each different illumination sources. Thus, the imaging system 114 produces one image related to the four locations, front, back, left and right of the illumination sources.

While the four images may seem quite similar, some illumination artifacts, such as reflection of light on the Petri dish or graduated shading, appear in the images due to the direction of illumination sources.

Illumination artifacts may comprise specular reflection which is a mirror reflection in a specific direction occurring after an illumination. Illumination artifacts may also comprise shading associated with objects having a specific height in the Petri dish. Illumination artifacts may further comprise graduated shading which relates to the light intensity being non-homogeneous.

Specular reflections comprise bright points and depend on the corresponding light source. This means that a specular reflection may only occur when using a light source related to a specific view such as the right view. Thus, specular reflection may not occur when using the light sources related to the three other views, i.e. the left, front and back views.

Figure 17:
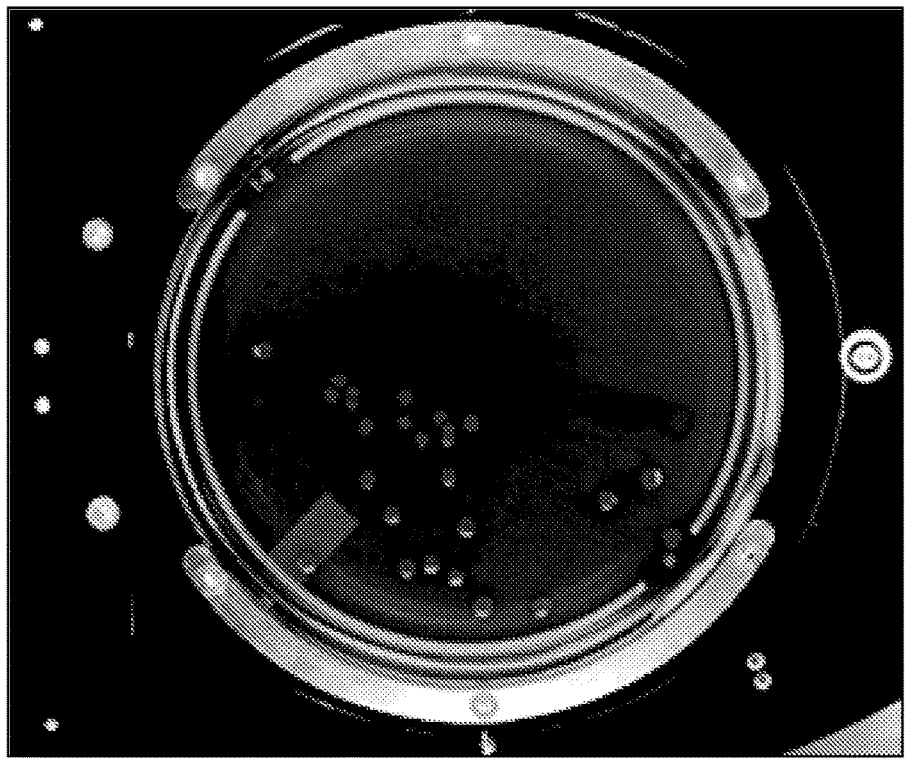
FIG. 17 shows an image from four illumination sources for three color channels according to the prior art.

As shown in FIG. 17 relating to the prior art, specular reflections are located on colony edges. Specular reflections may be located on different colony edges, depending on the direction of the light source used. FIG. 17 shows an image representing the simultaneous illumination of the four illumination sources i.e. back, front, left and right as a composite image.

Accordingly, there is a need to improve the quality of the image to optimize detection of the colonies in the image without such illumination artifacts.

The first aspect of the present invention relates to a method for removing illumination artifacts such as specular reflections.

Figure 18:
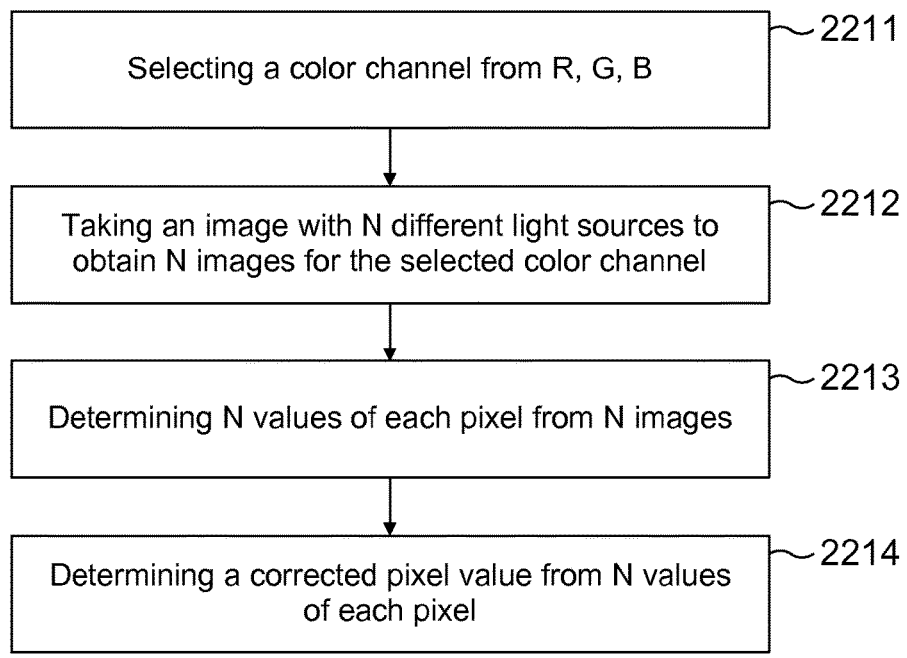
FIG. 18 is a flow chart showing the steps of a method for removing illumination artifacts on the image of colonies located in a Petri dish, according to a second aspect of the present invention.

The method for removing the illumination artifacts operates according to the following steps shown in FIG. 18.

As shown in FIG. 18, in step 2211 a color channel is selected from the three color channels R, G and B. In step 2212, an image of the Petri dish is taken based on a determined number N of views. Each N view relates to an illumination source being oriented in a specific direction towards the Petri dish. Thus, each illumination source produces a front view image, a back view image, a left view image or a right view image as shown in FIG. 2213.

In the context of a bottom annular illumination, all the illumination sources are located at the same incidence angle to the Petri dish. In the present invention, the bottom annular illumination for this method of removing specular reflection comprises a number N equal to four light sources which produce four different images. As a result, step 2212 provides four different images. At least, the number N of different views should be equal to three to obtain an optimized resulting corrected image at the end of the removal method. In addition, the illumination sources must be evenly located around the Petri dish and also have the same angle of incidence with the Petri dish.

In step 2213, N values of each pixel in the N images are determined. This means that for all four images corresponding to the four different views of the four illumination sources, each pixel p is defined with a corresponding value.

In step 2214, considering each pixel p, a corrected pixel value is determined. The corrected pixel value may relate to the median value v related to each pixel p, wherein the median value is determined from the N values of the pixel. This means that for a pixel p1 having four values such as leftbottom value (LBp1), frontbottom value (FBp1), backbottom value (BBp1) and rightbottom value (RBp1), the median value is computed to obtain a unique value for the specific pixel in the corresponding color channel. Thus, after computing the median value, the median value of the pixel p1 may be any one of the N values.

The corrected pixel value may also relate to a first calculated value relating to the average of the pixel values being middle values within N pixel values.

The corrected pixel value may also relate to a second calculated value relating to the average of the pixel values outside the lowest and the highest values.

Thus, the corrected pixel value comprising the median value, the first calculated value or the second calculated value may replace the pixel value of the considered pixel for the corresponding color channel. The example below illustrates a case where the bottom annular view comprises four different light sources, i.e. N=4. The corrected pixel value relates to the median value. The median value is determined for each of color channels R, G and B.

Figure 19:
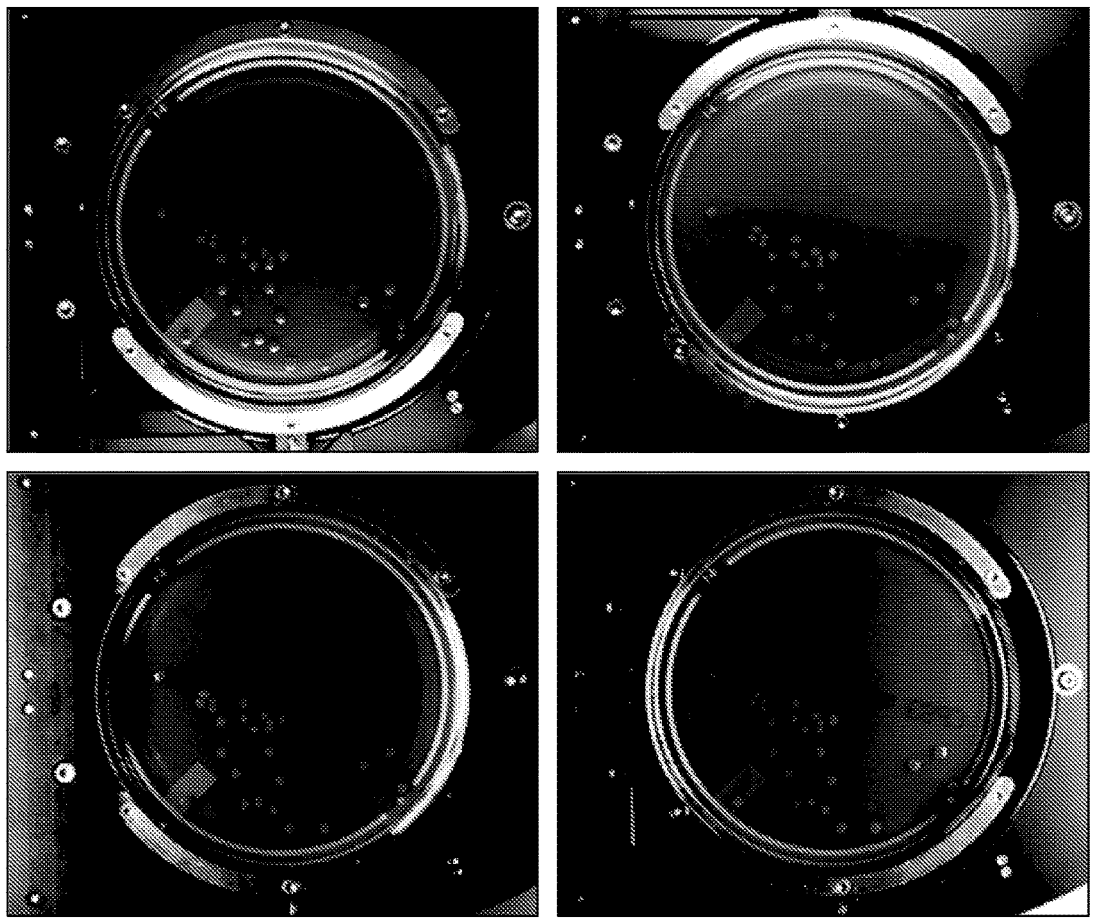
FIG. 19 illustrates four different images, each image referring to a different view of an illumination source, according to a second aspect of the present invention.
Figure 20:
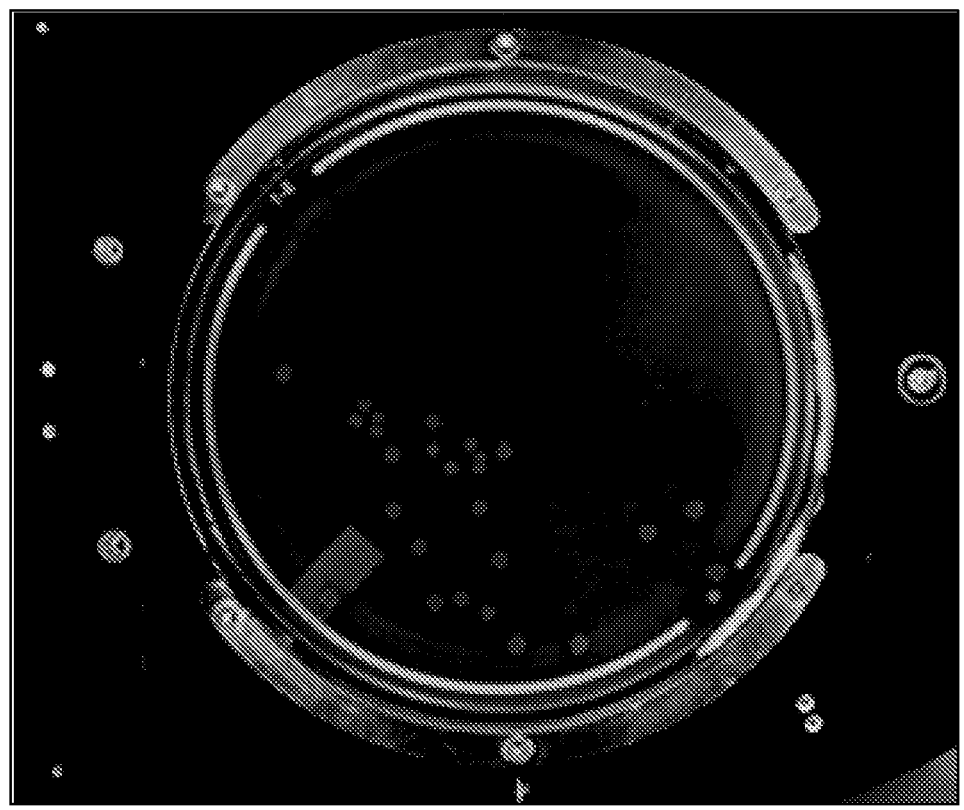
FIG. 20 shows the median image produced with the four different images of FIG. 19, according to a second aspect of the present invention.

Example of determination of the median value for a specific pixel p1:
For color channel R:
N=1; Leftbottom view-image 1-LBp1=R1
N=2; Frontbottom view-image 2-FBp1=R2
N=3; Rightbottom view-image 3-RBp1=R3
N=4; Backbottom view-image 4-BBp1=R4
Where R1>R2>R3>R4 for example,
Determination of Median value of p1 for color channel R:
$V1(p1)=(R2+R3)/2$
For color channel G:
N=1; Leftbottom view-image 1-LBp1=G1
N=2; Frontbottom view-image 2-FBp1=G2
N=3; Rightbottom view-image 3-RBp1=G3
N=4; Backbottom view-image 4-BBp1=G4
Where G1>G2>G3>G4 for example,
Determination of Median value of p1 for color channel G:
$V2(p1)=(G2+G3)/2$ For color channel B:
N=1; Leftbottom view-image 1-LBp1=B1
N=2; Frontbottom view-image 2-FBp1=B2
N=3; Rightbottom view-image 3-RBp1=B3
N=4; Backbottom view-image 4-BBp1=B4
Where B1>B2>B3>B4 for example,
Determination of Median value of p1 for color channel B:
$V3(p1)=(B2+B3)/2$ In the prior art, the bottom annular view relates to a physical combination of the N images obtained from the simultaneous illumination of N illumination sources as shown in FIG. 17. In the present invention, each illumination from each illumination source is processed one by one as shown in FIG. 19. Thus, N images relating to the N illumination sources are obtained. After determining the corrected pixel values for each pixel of N images, a resulting image is computed based on an algorithm. In the corrected image as shown in FIG. 20, the determined median value is affected to each corresponding pixel. This means that considering each color channel, the pixel value is equal to the median value of this pixel for the considered color channel.

Based on the above example, median values of pixel p1 are allocated as follows:
For color channel R, p1 is allocated with $V1(p1)=(R2+R3)/2$
For color channel G, p1 is allocated with $V2(p1)=(G2+G3)/2$
For color channel B, p1 is allocated with $V3(p1)=(B2+B3)/2$ The corrected image, as shown in FIG. 20, shows the Petri dish with objects such as colonies with no illumination artifacts.

During the operation of a further image processing algorithm, the illumination artifacts are considered. This negatively impacts the process of the algorithm for producing an image. In the prior art, a step for adapting the algorithm related to the resulting image is required. Thus, the prior art method requires that the parameters of the algorithm be adapted to the content of the image based on the quantity and type of illumination artifacts. The advantage of the method according to the first object of the invention above described for the second aspect of the present invention is that no specific adaptation or modulation of the parameters of the algorithm is required for producing the resulting image.

In another embodiment, the N images may also comprise white and black images.

Figure 10:
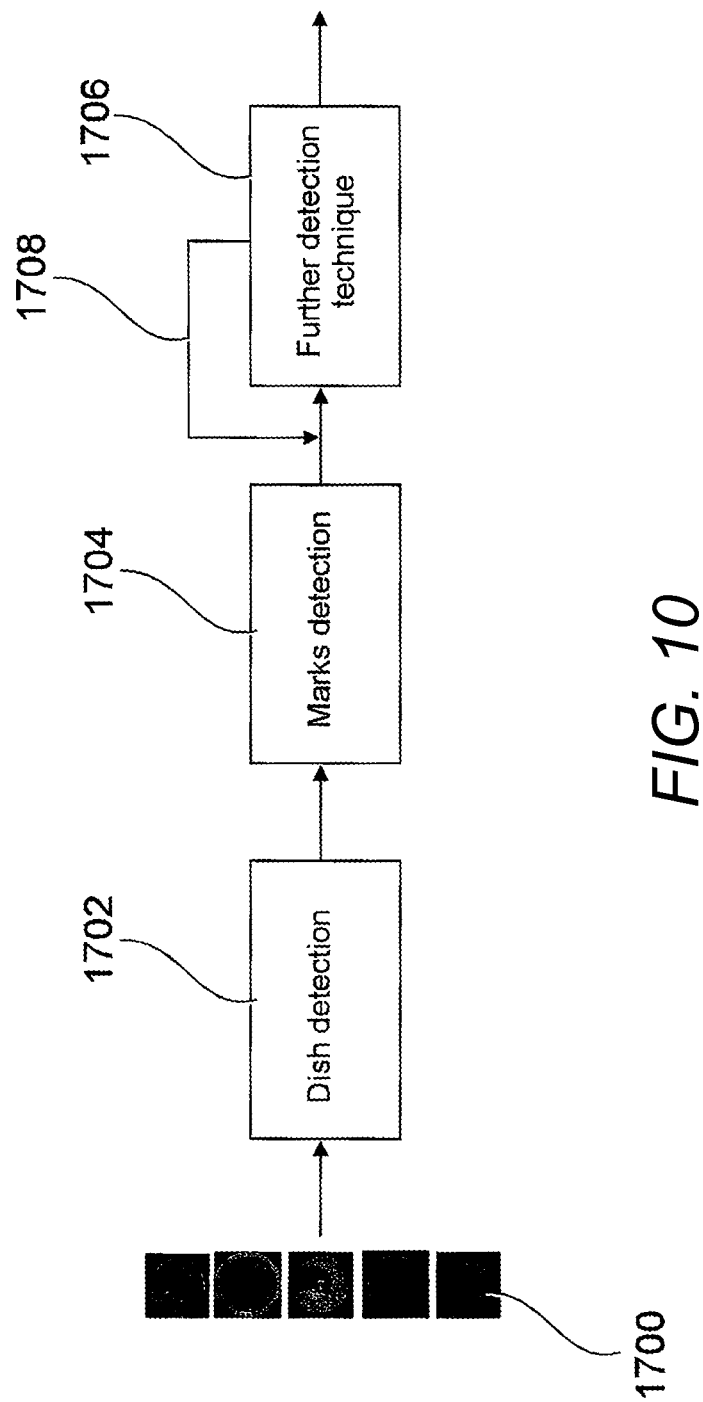
FIG. 10 is an example of an image processing technique, according to one aspect of the present invention.

In a further embodiment a number of additional image processing techniques will now be described. FIG. 10 shows a simplified view of a generic image processing technique. In a first step 1700, a plurality of images is taken from one or a combination of the illumination source. A dish detection technique step 1702 is carried out to detect a first type of characteristics of the dish such as the contours and edges of the dish. Then in a step 1704 a mark detection technique is carried out to identify a second type of characteristics such as marks or serigraphy on the dish. In a step 1706 a further detection technique is carried out. There are a number of different further detection techniques which will be described in greater detail below which relate to the detection of biological objects or colonies. There may be a sequence of different image processing techniques carried out on the same sample and if this is the case the process will feedback in step 1708 to a subsequent further image processing technique. In some of the further detection techniques it may not be necessary to carry out dish detection and/or mark detection as these may not assist in the further detection technique being carried out. As such at least some of the further detection techniques may be stand alone techniques.

The dish detection technique 1702 is a technique which identifies the rings of the Petri dish formed by the walls and the lid thereof. The technique involves an object detection technique, such as a circular Hough transformation (as described in: Duda, R. O. and P. E. Hart, "Use of the Hough Transformation to Detect Lines and Curves in Pictures," *Comm. ACM*, Vol. 15, pp. 11-15 (January, 1972) to detect circular objects of a predetermined size. A backlight image is used as this gives a well contrasted image of the sample. In addition, the size of the Petri dish is entered to indicate to the transformation the nature of the circular object or objects being sought. The number of rings being sought may also be entered so that the various rings of the dish and the lid can be located as appropriate. The application of the Hough transformation could result in localization of one or more of the rings (lid or main body) of the Petri dish. In a further step, this information could enable the removal of the Petri dish rings or masking of the rings or the exterior of the dish from a resultant image, if required. This ensures that further detection methods can focus on the interior of the Petri dish. It should be noted that the Hough transformation applies to circular vessels; however other object detection algorithms may be used for vessels which are different shapes.

Alternatively, another kind of object detection technique can be applied to detect the contours of the Petri dish without using the circular Hough transformation. The alternative object detection technique allows retrieving a closed contour in the image to identify the border of the Petri dish. The alternative technique comprises a first step of retrieving the potential contour of the image based on a well-known technique such as the Canny edge detection method described in the document "A Computational Approach to Edge Detection" by J. Canny or the morphological gradient edge detection. Thus, the first step provides a grayscale image.

The alternative technique comprises a second step of filling the retrieved contours using a Matlab™ function such as "imfill with holes option". This means that the filling step only fills the interior of the dish in the situation where the contours are closed contours around the dish. The alternative technique further comprises a step of retrieving the largest inscribed circle within the closed contour. In a further step the plate radius and the location of the centre of the dish are determined based on the corresponding radius and location of the centre of the inscribed circle. The advantage of the alternative technique is that no predetermined size of the contour needs to be known in advance to carry out this object detection technique.

Figure 11:
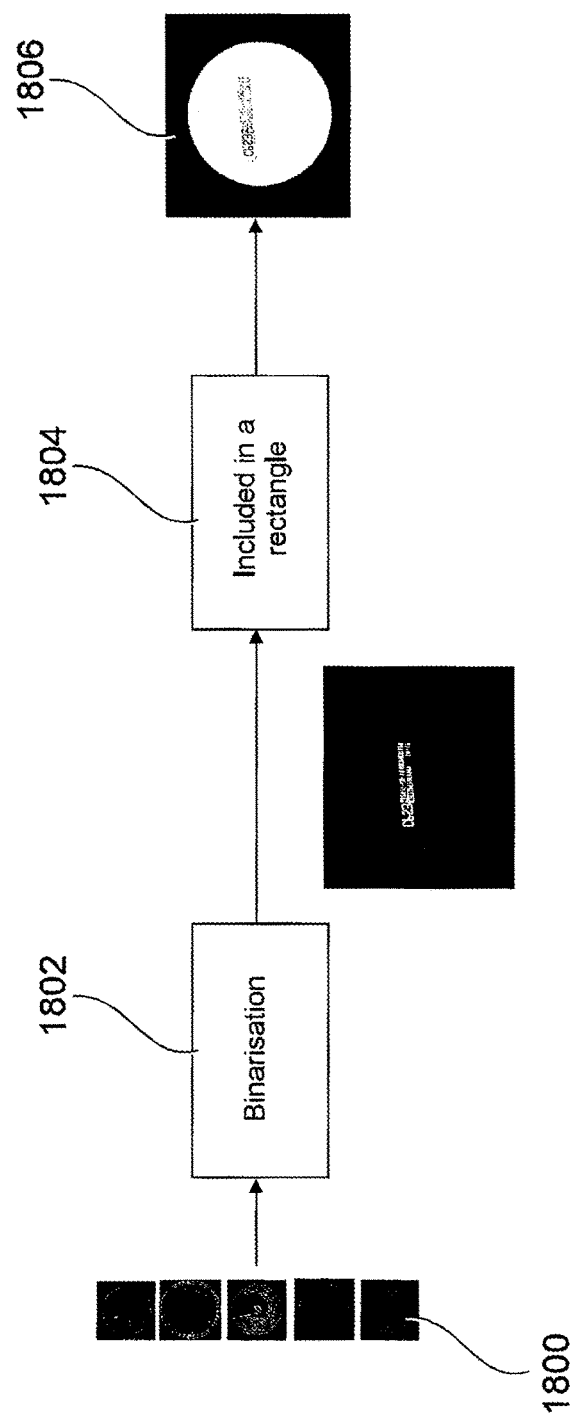
FIG. 11 is a process for mark detection, according to one aspect of the present invention.

Referring to FIG. 11, the mark detection technique is now described. In a first step 1800 a plurality of images of a Petri dish are loaded into the system.

A segmentation process operates in step 1802 wherein the images are segmented in a binarizing process in step 1802 to form a digitized image. The segmentation process provides a separation of pixels into a plurality of classes. The binarizing process is a specific segmentation process which provides two classes of pixels, either black or white. The binarizing process is based on the original structure of the serigraphy which is made of ink dots of dark color. Thus, the binarizing process comprises steps for retrieving objects having a dot shape and a dark color. As a result, the binarizing process provides an improved method for distinguishing serigraphy from other objects such as colonies, bubbles or defaults. The binarizing process of step 1802 comprises several steps for identifying serigraphy on the Petri dish. The binarizing process differs from the well-known K-means clustering method. The k-means clustering method gathers pixels of the same color. The binarizing process gathers pixels having similar color and also being in close vicinity. A search can be made to identify objects that are, for example, substantially rectangular in shape in step 1804. More generally, a search may be made for features or objects that present non-biological characteristics. These features could include particular shapes, serigraphy, bar codes, tickets, labels etc. The identified objects are marked and assumed to be marks on the Petri dish. The resultant image is 1806 and can be used to localize and if needed remove or mask marks on the dish, irrespective of the original image. The position of the mark can be used in all other images of the same dish, whatever the illumination, irrespective of the image or set of images used to detect the marks in the first instance. In a particular example this algorithm may be used to identify the marks when the dish appears to have no colonies therein.

Figure 12A:
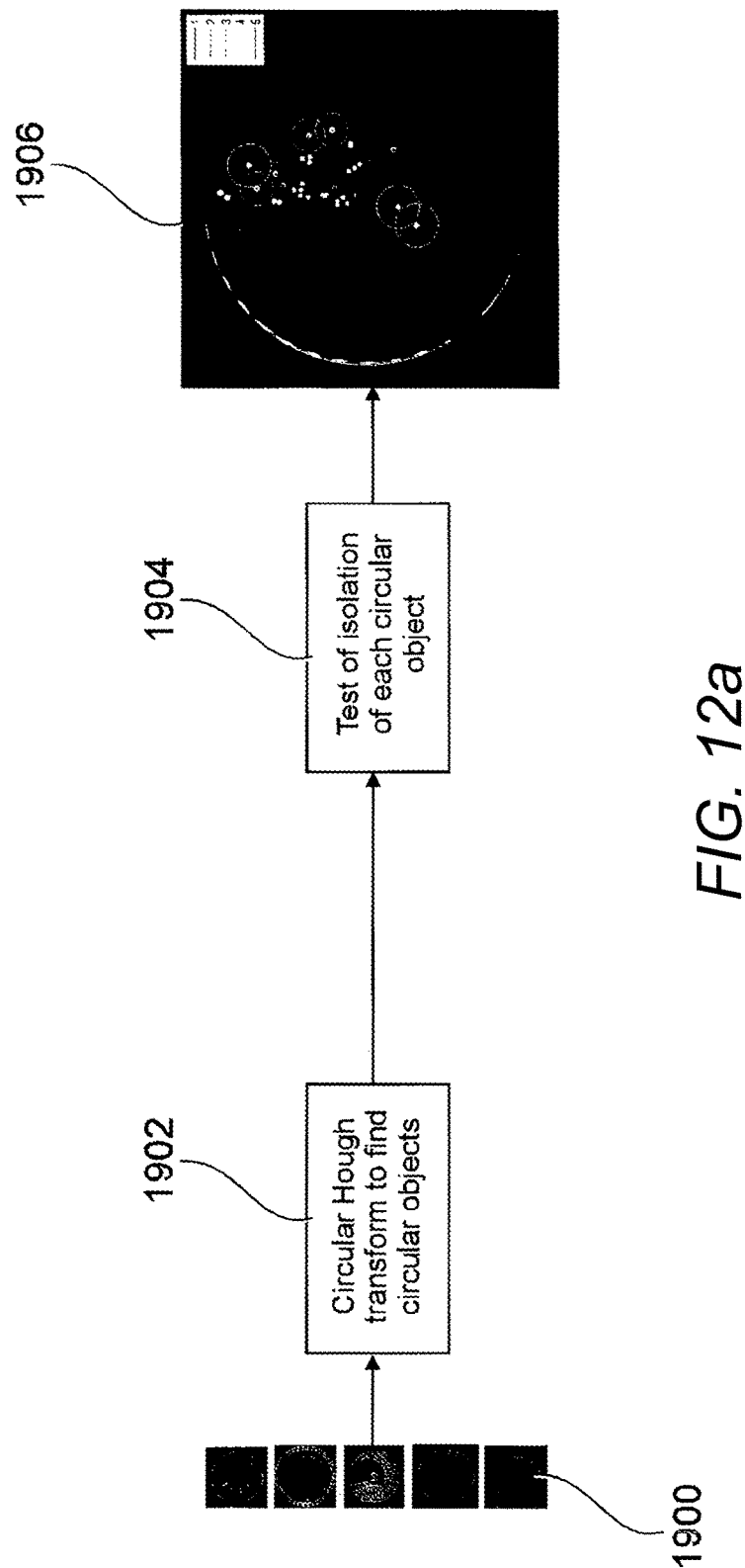
FIGS. 12a and 12b are process diagrams showing the steps for an image processing technique, according to one aspect of the present invention.
Figure 12B:
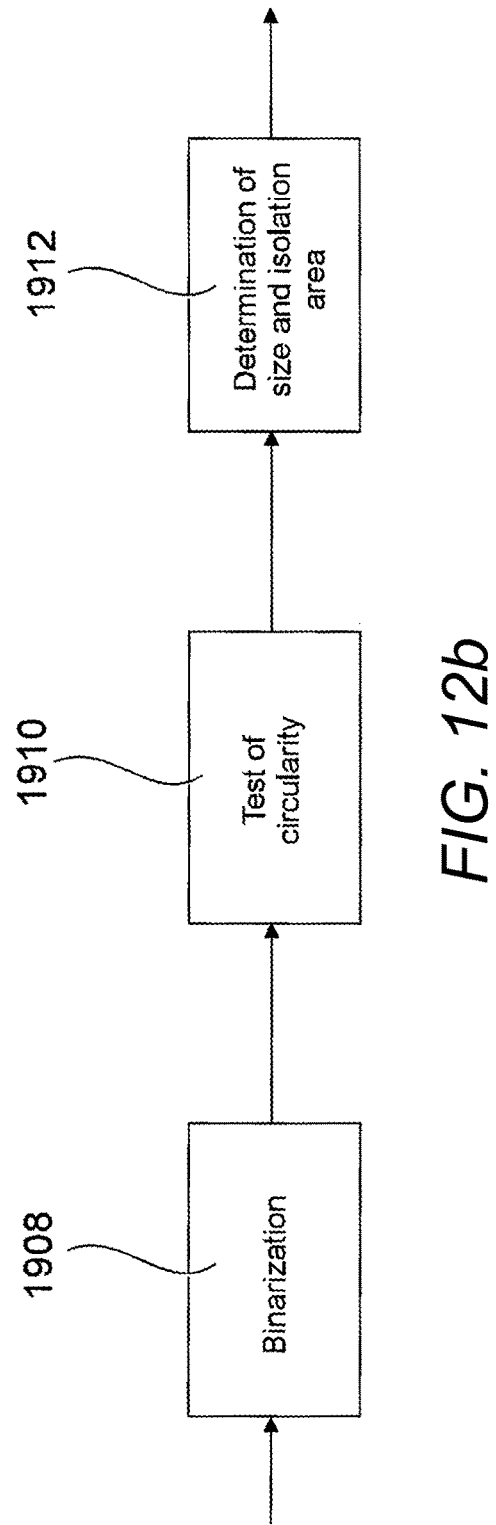
Figure 13:
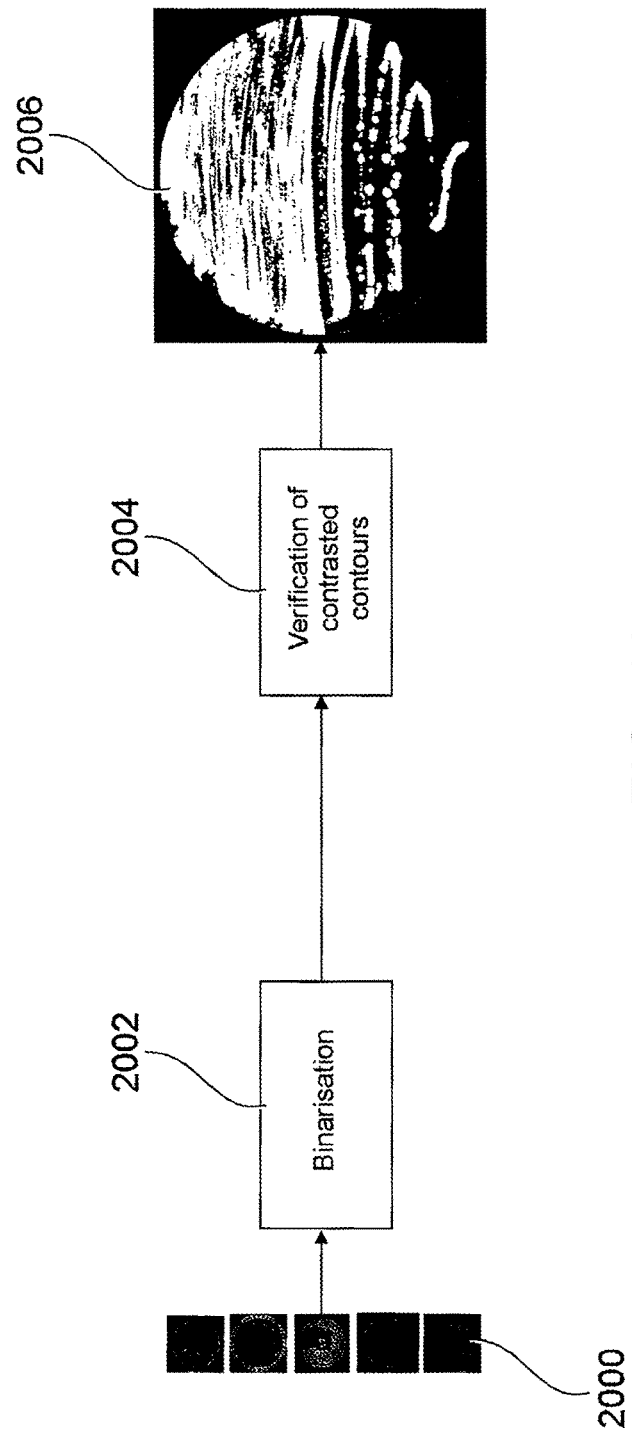
FIG. 13 is a process diagram showing the steps for an image processing technique, according to one aspect of the present invention.

Certain further image processing techniques will now be described. FIGS. 12*a* and 12*b* show a process for detecting isolated colonies. In a first step 1900, a plurality of images is taken using different illumination sources. One image or a combination of the images is selected for further processing. The selected image or images are then processed by applying a circular Hough transformation in step 1902. This identifies circular objects, such as colonies of bacteria. A typical colony size may be entered to limit the Hough transformation to search for circular elements of a specific size. Once circular objects (colonies) have been identified an isolation test is applied to each circular object at step 1904. The isolation test is further described with reference to FIG. 12*a*. The isolation test includes the step of determining the center of the identified circular object (not shown). A binarizing step 1908 is then applied to obtain a binarized image wherein the center of the binarized image corresponds to the center of the identified circular object. Thereafter, a test of circularity is carried out in step 1910 on the binarized image to verify if the binarized object is circular. A further step of determination of size and isolation area 1912 relates to a method as described below and is carried out to determine the size of the colony as well as the diameter of the colony and the area of isolation around the colony. A typical output is shown as 1906.

The location of the colonies inside the Petri dish may not be convenient for the user or for an automated picking device or a semi-automated picking device. As a result, it appears that there is a need to provide detailed information regarding the neighborhood of the colony to be picked up.

The present second aspect of the invention is to determine the neighborhood of an object of interest such as a colony to obtain detailed information to provide guidance on a further manual or automated picking process of the colony. The aim of the method is to determine the proximity to neighbors of a colony to obtain a corresponding picking profile of the colony to guide the picking process. The previously binarized image in step 1902 is considered. In the present invention, it is assumed that all the binarized objects in the binarized image are microorganisms.

Figure 14:
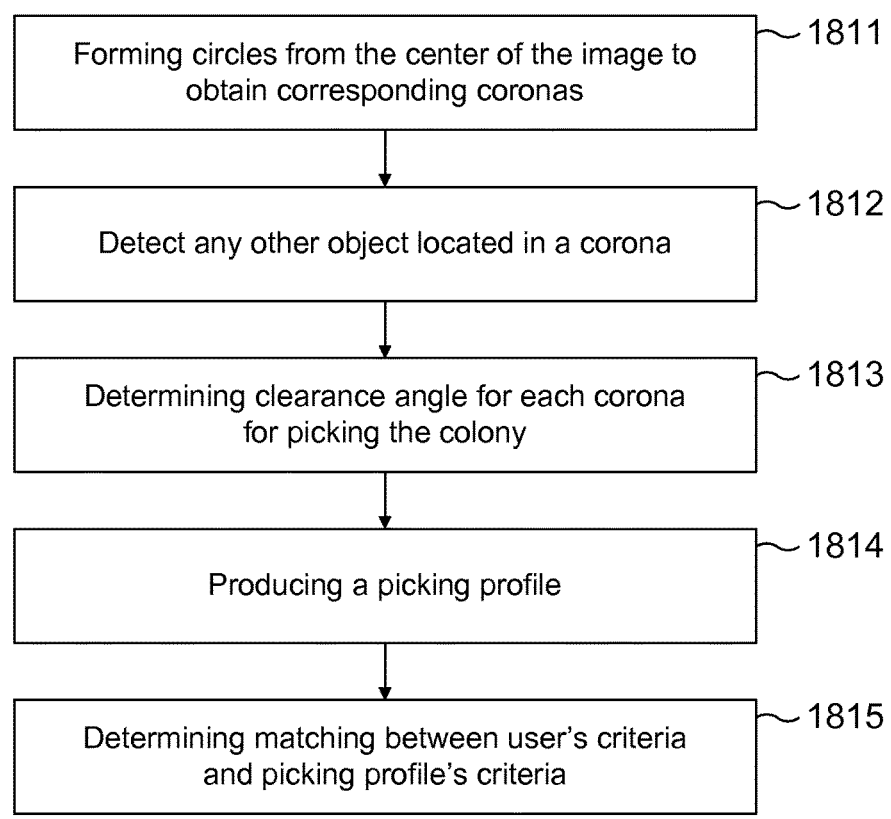
FIG. 14 is a flow chart showing the steps of a method for improving the picking method, according to one aspect of the present invention.

As shown in FIG. 14, other objects are searched in the neighborhood of the center of the binarized image, this being the center of the object of interest. The searching method comprises forming a number of circles of a determined radius in step 1811 to search for any other objects located in the corresponding circular surfaces such as coronas around the center of the binarized mask image. Each corona comprises a circular surface with a specific radius value. Each corona is delimited by two circles having successive radius values. In step 1812, the searching method further comprises determining the presence and location of at least one other object in a corona. If no other object is located in the corona around the center of the binarized image, then the corona is defined with an angular sector of 360° around the center of the binarized image. If any other object is located inside the corona, the determination of the corresponding clearance angle is carried out in step 1813. The clearance angle relates to an angular sector for defining the availability of the central object to be picked by a user or an automated device. The value of the clearance angle is directly proportional to the number of other objects detected within the corona. The clearance angle relates to the maximum value of an angular sector of a corona where no other object is present. Thus, the picking process may occur in the corresponding empty area of the corona at the best conditions for the user or the automated device. Other values of the clearance angle may also be determined to details all the corresponding isolations areas around the object of interest.

Figure 16:
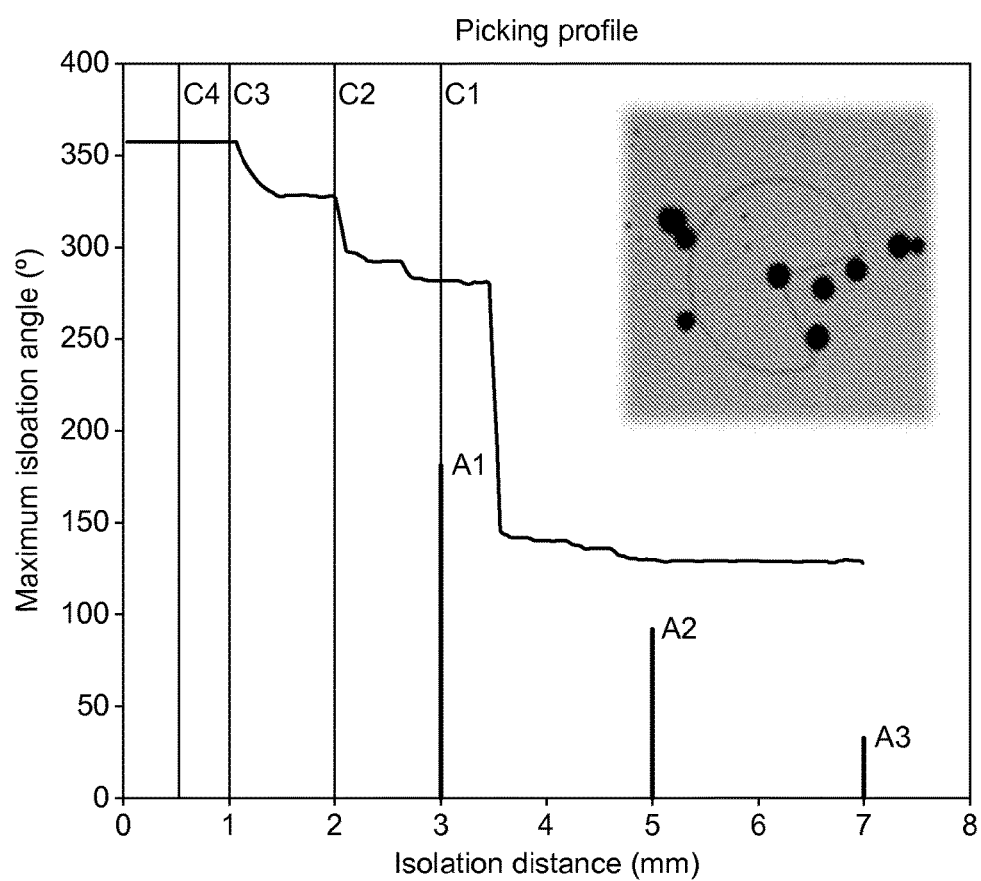
FIG. 16 represents a picking profile of a colony depending from an isolation distance from the colony and an isolation angle around the colony, according to one aspect of the present invention.

Thus, a picking profile of the related object of interest is produced in step 1814. An example of a picking profile related to a specific object of interest, i.e. a colony, is shown in FIG. 16. The picking profile comprises picking profile values related to clearance angles and corresponding coronas for the object of interest.

In the prior art, as shown in FIG. 15, a look-up table defines criteria or user criteria such as specific clearance angles and specific configuration of the central object of interest. Seven criteria are used to rank the colonies depending on their level of isolation within the Petri dish. For example, a colony belongs to a class C2-A3 if there is no other object located inside a corona of 2 mm around the colony and if no other object is located in an angular sector of 30° up to 7 mm around the colony. The criteria are set based on the current knowledge and practice of a user. In a process of the prior art, a user has specific user criteria related to how to pick up the colony with optimized conditions for the user. The criteria relate to the usual behavior of the user for picking the colony, based on whether the user is right-handed or left-handed and/or the size of the colony and/or the location of the colony, for example near the edge of the Petri dish. Other criteria may also be considered. In the present second aspect of the invention, in step 1815, the user has to determine which user criteria match the picking profile in order to determine if a picking process for picking a colony can be carried out.

The second aspect of the present invention provides a tool in addition to the look-up table of the prior art for indicating to the user or to the automated device where the above user or any automated device criteria may be applied for a specific central object of interest. As such, the present invention provides an additional means for determining the neighborhood of a colony for improving the picking process of the colony. In addition, the picking profile as shown in FIG. 16 may also be applied without using the look-up table to determine the best conditions for picking a colony.

A colony is determined as being isolated if the colony matches at least one criterion cluster of the look-up table. Most isolated colonies belong to more than one criterion cluster. In the picking profile shown in FIG. 16, the colony does not belong to class C1 where clearance angle is less than 360° and the distance to the colony is 3 mm. However, as shown in FIG. 20, the colony belongs to classes C3-A1, C3-A2 and C4-A1. Thus, the user or the automated device can easily determine which criterion may be applied for a specific colony, instead of trying to apply all the potential criteria of the look-up table. The picking profile as obtained from the present invention provides guidance and allows the user or the automated device to save time when performing the picking process.

A third aspect of the present invention relates to the determination of the number of colonies or objects located in the Petri dish.

The present third aspect of the invention deals with a solution for counting isolated colonies and colonies from grouped colonies, including identifying colonies located near the edge of a Petri dish. The wording "connected component" or "element" relates to an object such as a colony or a mass of objects.

Figure 21:
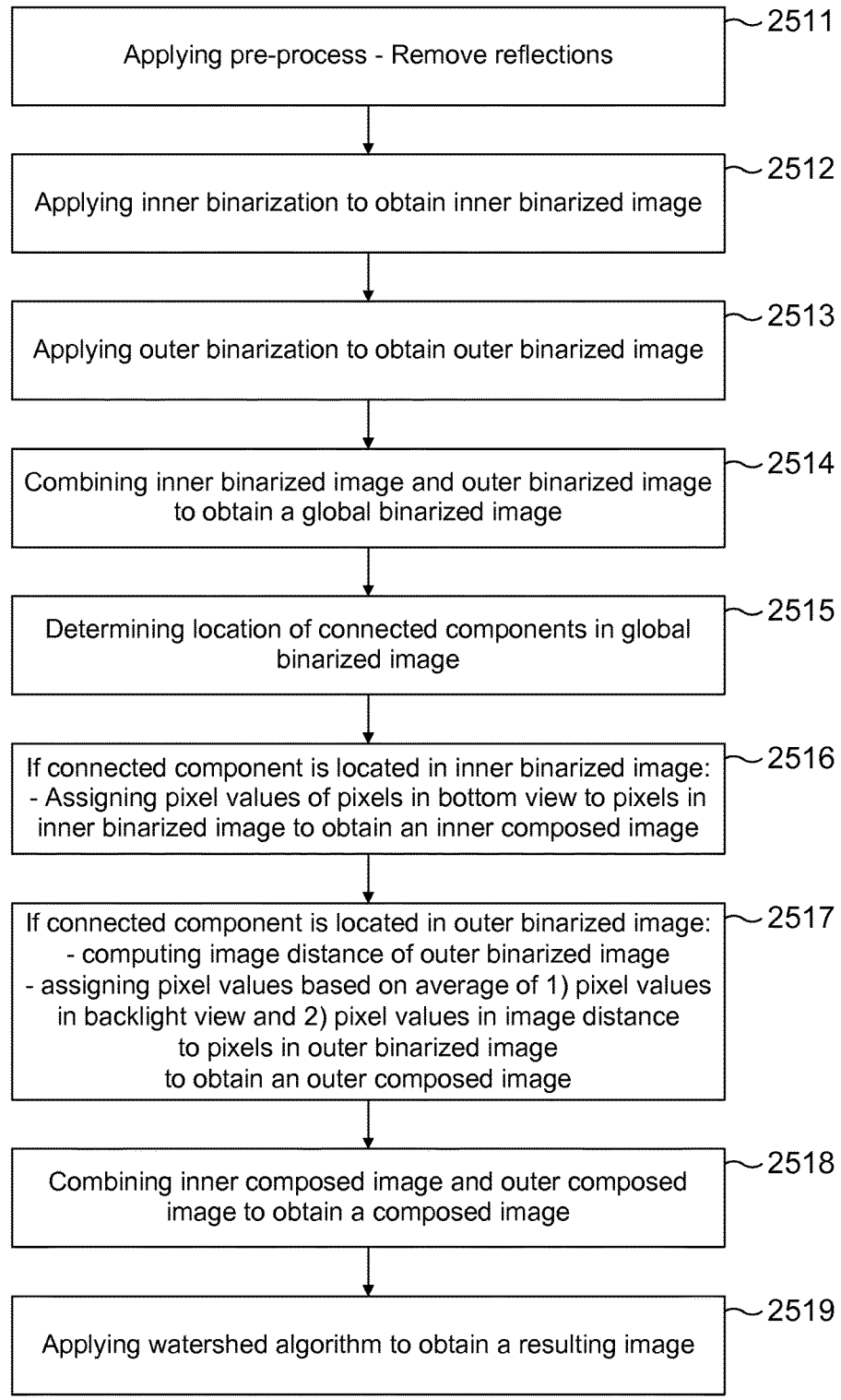
FIG. 21 is a flow chart showing the steps of a method for counting colonies in a Petri dish, according to a third aspect of the present invention.
Figure 22:
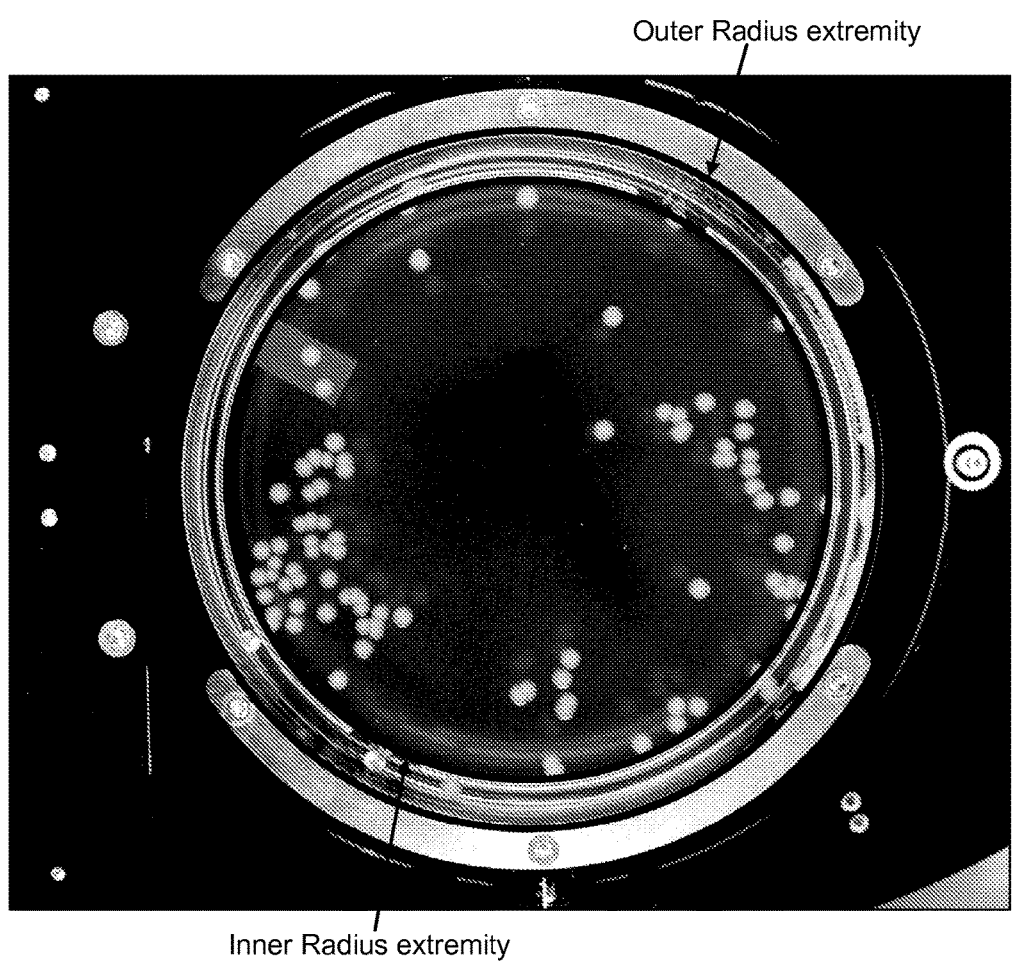
FIG. 22 represents an image of the Petri dish showing the inner radius and the outer radius of the Petri dish, according to a third aspect of the present invention.

As shown in FIG. 21, in step 2511, a pre-process relating to the removal of reflections on the Petri dish is applied. The pre-process can be based on the process for removing illumination artifacts as described according to the first distinction of an inner binarized image and an outer binarized image. Thus, there is a need to define the boundary inside the dish to determine the inner part of the dish and the outer part of the dish. The center and radius of plastic of the borders of the Petri dish may be estimated either by applying the dish detection method above mentioned. The outer radius is then set to 100% of the estimated radius to obtain an outer radius which corresponds to the distance from the center of the Petri dish to the border of the Petri dish. The extremity of the outer radius is shown in FIG. 22.

In a similar manner, the inner radius is set to 85% of the estimated radius, for example. The extremity of the outer radius is shown in FIG. 22.

The inner radius and the outer radius enable the building of two corresponding binary masks, the inner mask and the outer mask. The inner mask corresponds to the inside of the dish, excluding the periphery of the dish. The outer mask corresponds to the whole dish, including the periphery of the dish. The inner radius defines the first area of the Petri dish and the outer radius defines the second area of the Petri dish. The combination of the inner area and the outer area defines the whole surface of the Petri dish.

Figure 23:
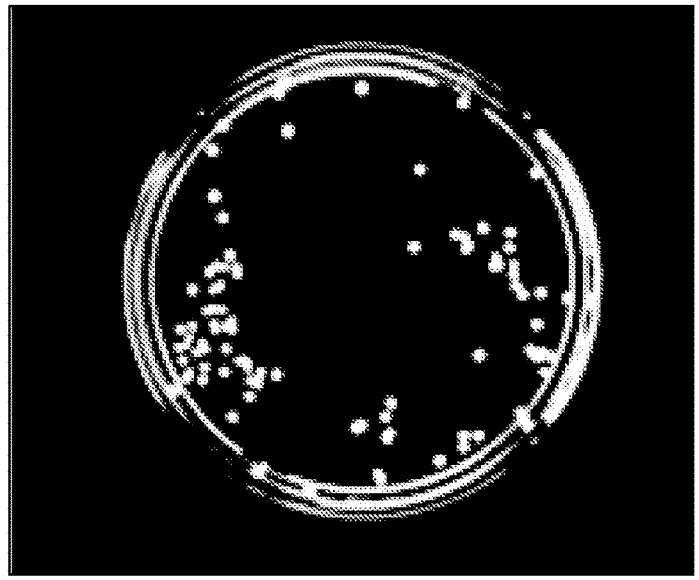
FIG. 23 represents a binarized image of the Petri dish, according to a third aspect of the present invention.

In step 2512, a binarizing process is performed to obtain a global binarized image. The inner binarizing process of step 2512 is performed by using the bottom black background view. The image is then converted into a greyscale image. The greyscale image is then binarized using the Otsu method. The Otsu method is used to reduce a grey level image to provide a binarized image. In the inner binarizing method, the inner pixels, defined with the inner mask described above, are used to compute the required Otsu threshold value. Based on this threshold value, the whole image is binarized as shown in FIG. 23.

Figure 24:
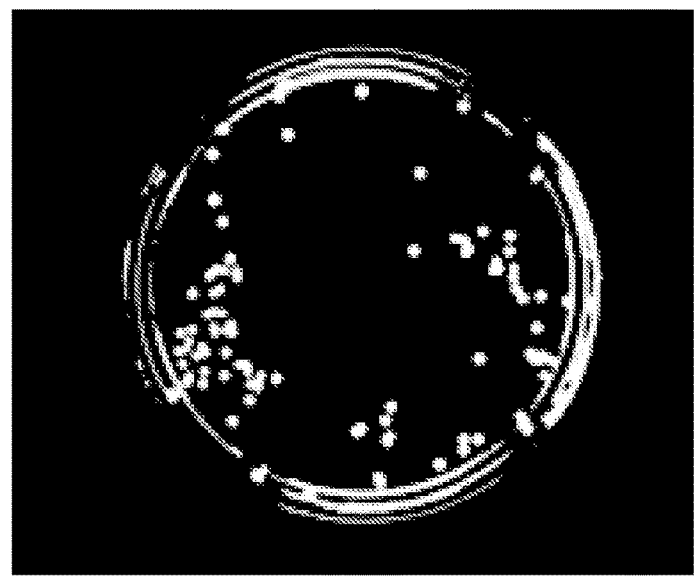
FIG. 24 shows a binarized image after applying a morphological opening function, according to a third aspect of the present invention.

The binarized image is then cleaned using a function of the prior art called morphological opening. The morphological opening function allows small objects from the foreground of the image to be removed and placed in the background of the image. In the present invention, the morphological opening function comprises applying a disk-shaped structuring element with a radius of 5 pixels. The present use of the morphological opening function therefore removes objects smaller than the structuring element as shown in FIG. 24.

Figure 25:
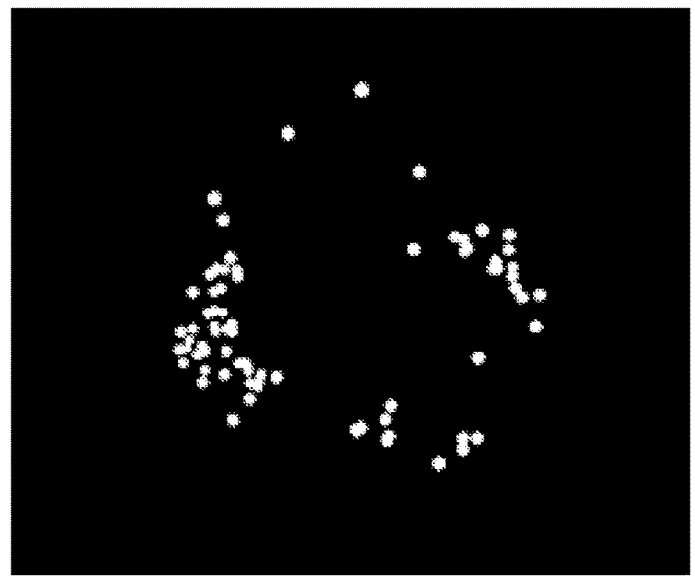
FIG. 25 shows an inner binarized image, according to a third aspect of the present invention.
Figure 26:
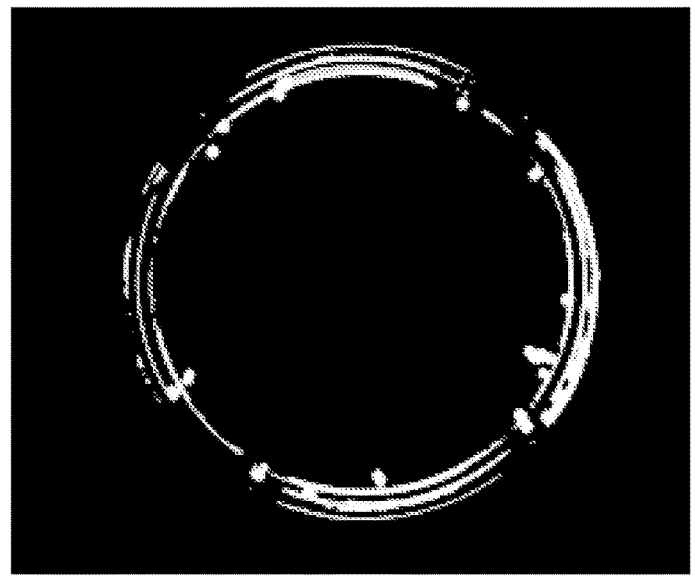
FIG. 26 shows an outer binarized image, according to a third aspect of the present invention.

As the whole dish has been binarized, the binarized image then includes inner colonies and outer colonies located on the periphery of the Petri dish. In a further step, the binarized image is split into an inner binarized image shown in FIG. 25 comprising connected components located in the inner mask and an outer binarized image shown in FIG. 26 containing only connected components that are totally or partially included in the periphery of the Petri dish. The present third object of the invention comprises steps for providing an improved outer binarized image. Indeed, as many reflections occur on the periphery of the Petri dish, the outer binarized image obtained with the above binarizing step is often incorrect as specular reflections give rise to objects being wrongly identified as colonies. Thus, there is a need to improve the outer binarized image. The following steps provide a method for improving the quality of the outer binarized image by using parameters of the inner binarized image as determined in above steps.

Figure 27:
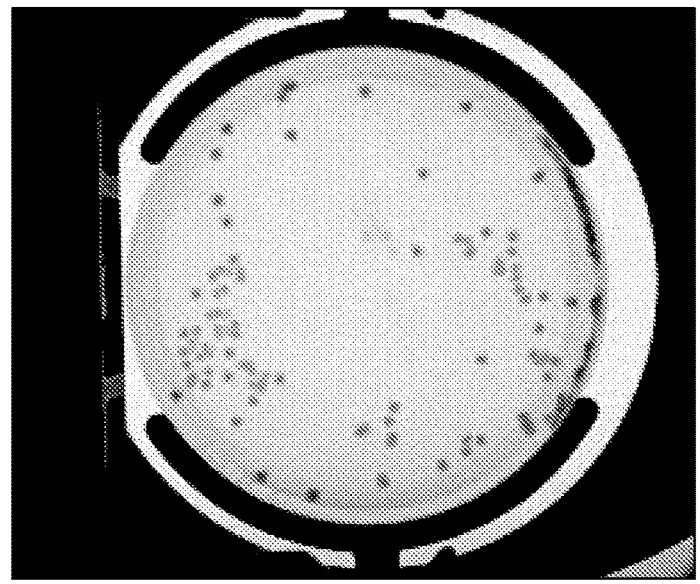
FIG. 27 shows a first resulting image illuminated with a backlight view, according to a third aspect of the present invention.

In step 2513, the outer binarizing process comprises using the outer binarized image with the color backlight view. A well-known function called morphological closing for removing small holes in the foreground. The present morphological closing is used with a disk-shaped structuring element with a radius set to the minimum colony radius. The minimum colony radius can be determined using an estimation of the minimum radius of colonies as in the inner binarized image. Based on the knowledge of a skilled person in the art, the minimum radius can be between 10 and 15 pixels. After operating the morphological closing function, dark objects smaller than the structuring element are removed and as a result, the plastic borders are clearly visible on the backlight view as shown in FIG. 27. These steps provide a first resulting image.

Figure 28:
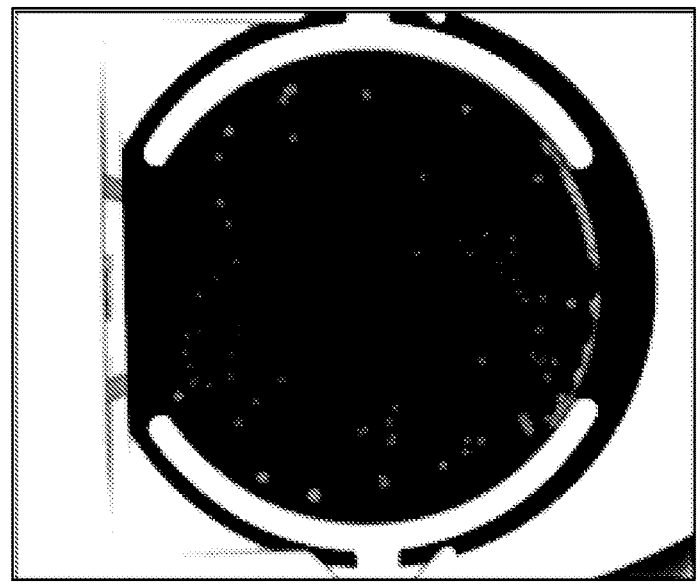
FIG. 28 shows an image I1 refining the first resulting image of FIG. 27, according to a third aspect of the present invention.
Figure 29:
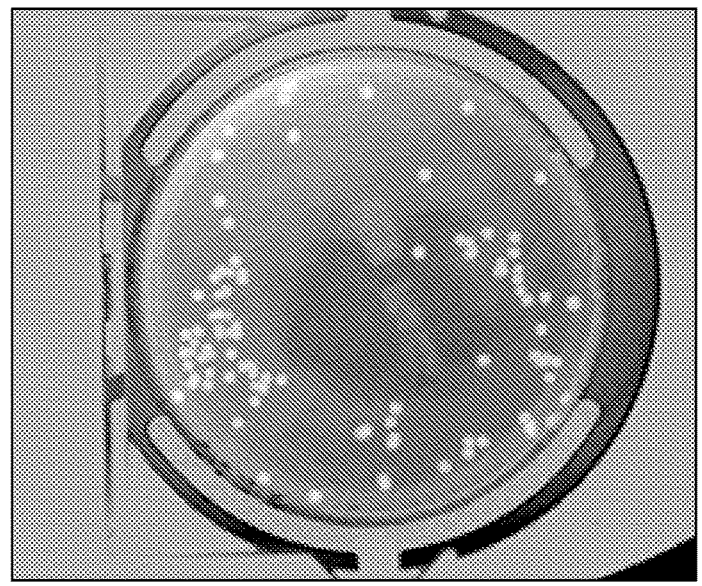
FIG. 29 shows an image I2 refining the first resulting image of FIG. 27, according to a third aspect of the present invention.
Figure 30:
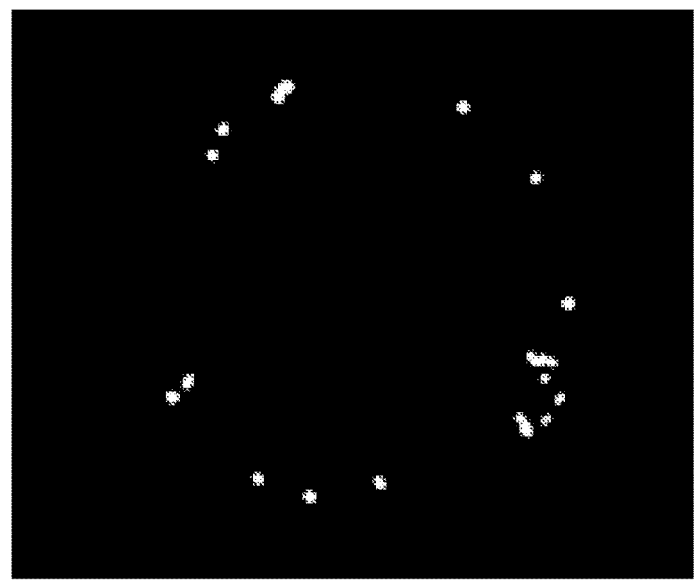
FIG. 30 shows the combined outer binarized image after processing the conversion into Lab space relating to parameters I1 and I2, according to a third aspect of the present invention.

In a further step, the first resulting image is converted into Lab color space. This means that the first resulting image of the RGB space is converted into a second resulting image of the Lab color space. Two images I1 as shown in FIG. 28 and I2 as show in FIG. 29 are computed from Lab space:

$$I_1 = 1 - [L]$$

and $$I_2 = [[a] + [b]]$$

L,a,b are the channels of Lab space and [*] is the operator that rescales pixel values between 0 and 1 using the max-min normalization below:

$$[X] = \frac{X - \min(X)}{\max(X) - \min(X)}$$

The outer binarized image is refined using both image $I_1$ and $I_2$. The average value of inner binarized object on $I_1$ is computed to obtain $E[I_1]$. The average value of inner binarized object on $I_2$ is computed to obtain $E[I_2]$. Pixels having a value of $I_1$ lower than $0.9 \times E[I_1]$ are set to 0. In a similar manner, pixels having a value of $I_2$ lower than $0.9 \times E[I_2]$ are set to 0. The outer binarized image then contains less incorrect objects than the first resulting image as shown in FIG. 34.

In a final step, a morphological opening function is applied on the outer binarized image by using a disk-shaped structural element with a radius set to the minimum colony radius.

As a result, in step 2514, a global binarized image combining the inner binarized image and the improved outer binarized image is produced.

As the number of connected components located in the Petri dish may either relate to colonies or to masses of colonies, there is a need to improve the detection of colonies as described in steps below.

As shown in step 2515, connected components are identified to determine their location in the Petri dish. Two different steps may occur depending on the location of a specific connected component.

As shown in step 2516, if a connected component is located in the inner binarized image, each pixel value is allocated with the corresponding value of the pixel in the bottom view. Thus, an inner composed image is obtained.

As shown in step 2517, if a connected component is located in the outer binarized image, an image distance is computed. An image distance is well-known in the prior art. An image distance represents the image of an object based on the distance of the object to the edges of the object. Each pixel value of the connected component located in the outer binarized image is then allocated with a pixel value calculated as being the average value of the corresponding pixel value in the backlight view and the corresponding pixel value in the image distance. Thus, an outer binarized image is obtained.

Figure 31:
FIG. 31 shows the composed image of the Petri dish, according to a third aspect of the present invention.

In step 2518, the inner composed image and the outer composed image are combined to obtain a composed image as show in FIG. 31. In FIG. 31, the centers of colonies are set with high values and edges of colonies are set with low values. This means that pixel values of the composed image depend on the proximity of the pixel to the edges of the object. Based on the above steps, the composed image now represents colonies depending on two criteria which are the shape and the color of the colony. An extend-maxima transform function as known in the prior art, is applied to represent the centers of colonies. Thus, the application of a segmentation algorithm, as described below, for segmenting the composed image is improved.

Figure 32:
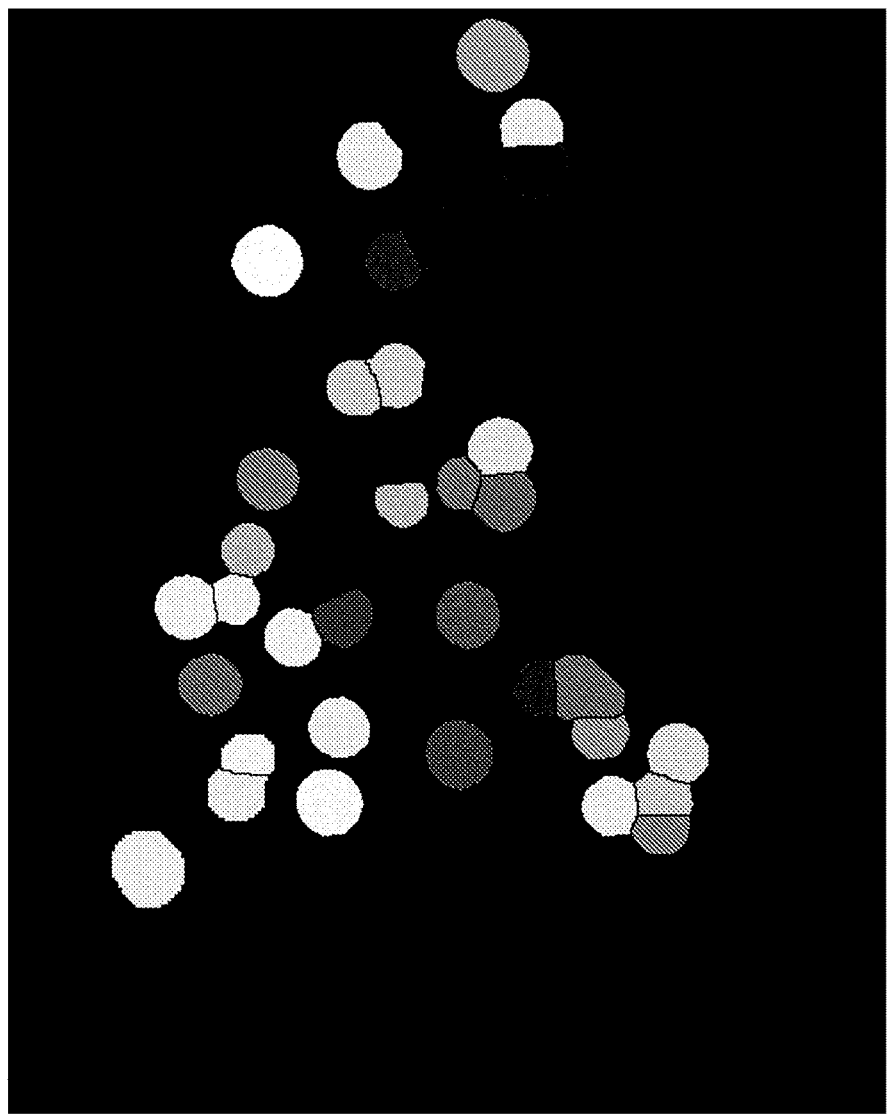
FIG. 32 shows the final image of the Petri dish for counting colonies, according to a third aspect of the present invention.

A segmentation algorithm, such as a watershed algorithm as known in the prior art, is applied to the composed image as shown in step 2519 to obtain the final representation of colonies. A final image as shown in FIG. 32 represents the colonies based on the above two criteria. This means that the object comprises identifiable edges. Thus, the final image facilitates the counting process of the colonies located in the final image.

It will be appreciated that other combinations of detection processes and optimal illumination sources may also be used. The positions of the illumination sources may be varied as required and are not dependent on the locations and direction of impact as described herein.

It is anticipated that the various enhancement and image processing techniques may be combined to analyze certain samples. This could entail using some or all of the techniques. The techniques may be applied in any sequence and the sequence may vary from one sample to the next. After the selected technique or techniques have been applied to a sample and no colonies have been identified, it may be determined that no colonies have grown on the sample.

In any image enhancement technique or image processing technique, the system may be provided with additional information at the start of the process. This additional information can include details relating to the Petri dish or other sample container such as size, shape, material, etc. The additional information may also include details of the culture media and any expected type of material that might be growing thereon. The information may also include imaging details such as exposure time, illumination source, orientation of the Petri dish, any other optical or control parameters, etc. The information may indicate the purpose of the application, e.g. industrial, medical, etc. Any other relevant information may also be included, as appropriate.

Such an automated process of analyzing a sample and detecting artifacts offers many advantages. The ability to detect and, if necessary, remove artifacts, such as writing and marks, makes isolation of colonies easier. The same technique could be used to detect other artifacts and, in an additional step, to remove them from the image. For example, if a batch of dishes has excess bubbles in the nutrient of a certain size and color, these artifacts may be detected by means of the above described process and, if necessary, removed. Similarly, other optical artifacts can also be treated.

The above described invention relates to methods and computer program products for obtaining and processing images of biological samples. Some or all of the aspects of the present invention is could be used in different environments.

Some of the above described invention relates to processes which can be carried out, at least to some extent, on a computer. Accordingly, reference to processing techniques and steps can be carried out by means of software or hardware or any combination thereof. Where an aspect of the invention has been described with respect to hardware, it will be appreciated that it can be a replaced by an appropriate software module. Similarly, software modules or processes can be replaced with appropriate hardware.

The invention according to the first, the second and the third object may be implemented by suitable programming of existing control systems of equipment for biological analysis, and associated equipment, and/or using separate data processing apparatus for image processing.

It will be appreciated there are many possible variations of the present invention which would fall within the intended scope of the invention.

The invention claimed is:

1. A method for defining an isolation area around an object of interest in a cell culture vessel, the method comprising:
    obtaining one or more images of the cell culture vessel using one or more of a plurality of illumination sources, each illumination source being capable of illuminating the vessel from a different direction;
    selecting an image or combination of images for further processing;
    applying a circular object detection transformation to identify one or more objects of interest being substantially circular objects in the cell culture vessel, the one or more objects of interest being representative of isolated colonies in the cell culture vessel and determining a center of an object of interest;
    applying a binarizing step to obtain a binarized image of the object of interest and other objects, wherein a center of the binarized image corresponds to the center of the object of interest;
    iteratively forming concentric circles with increasing radius, wherein the concentric circles are centered on the center of the binarized image;
    identifying coronas, wherein a corona is delimited by two circles having successive radius values; and
    for each corona:
        determining a presence and a location of other objects located in the corona to determine the presence and the location of the other objects, and
        determining a clearance angle defining an angular sector free of the other objects around the object of interest to define an isolation area around the object of interest and to define the availability of the object of interest to be picked.

2. The method of claim 1, further comprising providing a picking profile of the object of interest, wherein the picking profile comprises values related to each corona and a corresponding clearance angle.

3. The method of claim 2, further comprising using the picking profile in association with a lookup table for a picking process to determine an availability of a picking process for a colony relating to specific criteria of the lookup table.

4. The method of claim 1, wherein the value of said clearance angle is directly proportional to the number of other objects detected within the corona.

* * * * *